(12) United States Patent
Brandl et al.

(10) Patent No.: US 11,018,548 B2
(45) Date of Patent: May 25, 2021

(54) ELECTRICAL MACHINE HAVING A FRAME AND SLEEVE

(71) Applicant: SIEMENS AKTIENGESELLSCHAFT, Munich (DE)

(72) Inventors: Konrad Brandl, Thalmassing (DE); Christian Deeg, Altdorf (DE); Gerhard Dorr, Allersberg (DE); Benjamin Eichinger, Winkelhaid (DE); Wolfgang Johann Greul, Nuremberg (DE); Jürgen Hofmann, Spalt (DE); Eric Joseph, Nuremberg (DE); Ekkehard Ressel, Heilsbronn (DE); Uwe Scharf, Schwabach (DE); Mathias Scherer, Nuremberg (DE); Sebastian Weiss, Oberasbach (DE); Ulrich Werner, Bubenreuth (DE); Michael Stegherr, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 749 days.

(21) Appl. No.: 15/119,307

(22) PCT Filed: Feb. 17, 2014

(86) PCT No.: PCT/EP2014/053023
§ 371 (c)(1),
(2) Date: Aug. 16, 2016

(87) PCT Pub. No.: WO2015/120914
PCT Pub. Date: Aug. 20, 2015

(65) Prior Publication Data
US 2017/0012487 A1 Jan. 12, 2017

(51) Int. Cl.
*H02K 5/20* (2006.01)
*H02K 5/04* (2006.01)
(Continued)

(52) U.S. Cl.
CPC ............. *H02K 5/20* (2013.01); *H02K 1/185* (2013.01); *H02K 5/04* (2013.01); *H02K 5/225* (2013.01);
(Continued)

(58) Field of Classification Search
CPC .......... H02K 15/14; H02K 1/18; H02K 1/185; H02K 5/04; H02K 7/083; H02K 9/14;
(Continued)

(56) References Cited

U.S. PATENT DOCUMENTS 3,064,152 A * 11/1962 Gueck .................... H02K 15/16
310/426
3,114,061 A * 12/1963 Michel .................... H02K 5/04
310/60 R
(Continued)

FOREIGN PATENT DOCUMENTS

DE    195 17 524 A1    11/1996
DE    19517524 A1 *    11/1996  ............ H02K 1/185
(Continued)

OTHER PUBLICATIONS

Zimmermann (DE 19517524 A1) English Translation (Year: 1996).*
Tochio (JP 2011030304 A) (Year: 2011).*

*Primary Examiner* — Tulsidas C Patel
*Assistant Examiner* — Robert E Mates
(74) *Attorney, Agent, or Firm* — Henry M. Feiereisen LLC

(57) ABSTRACT

The invention relates to an electrical machine (1) comprising a rotor (4) which is rotatably mounted around a rotation axis (5) extending in the axial direction (3) in bearing devices
(Continued)

(16, 17), a stator (7) having two axial ends, an air gap between rotor and stator, an interior chamber (10) encompassing the stator (7) and rotor (4), a sleeve (11) encompassing a first part (111) which encloses the interior chamber (10), a frame (12) having a first (123) and a second (121) longitudinal support (123), a first (122) and a second (124) cross-support, and a dividing device (2) on the frame (12). The stator (7) comprises a fastening device (15) for connection to the frame (12) and the dividing device (2) can make the interior chamber accessible from the outside in a plane parallel to the frame (12). The invention further relates to a collection, to a frame (12), to a sleeve (11), or to a service or production method of such an electrical machine (1).

28 Claims, 16 Drawing Sheets

(51) Int. Cl.
| | |
|---|---|
| H02K 5/26 | (2006.01) |
| H02K 1/18 | (2006.01) |
| H02K 15/00 | (2006.01) |
| H02K 15/14 | (2006.01) |
| H02K 9/06 | (2006.01) |
| H02K 9/14 | (2006.01) |
| H02K 9/00 | (2006.01) |
| H02K 5/22 | (2006.01) |
| H02K 7/08 | (2006.01) |
| H02K 9/20 | (2006.01) |

(52) U.S. Cl.
CPC ............ *H02K 5/26* (2013.01); *H02K 7/083* (2013.01); *H02K 9/00* (2013.01); *H02K 9/06* (2013.01); *H02K 9/14* (2013.01); *H02K 15/0006* (2013.01); *H02K 15/14* (2013.01); *H02K 9/20* (2013.01)

(58) Field of Classification Search
CPC ........ H02K 15/0006; H02K 5/15; H02K 9/00; H02K 9/20; H02K 5/26
USPC .... 310/89, 216.113–216.137, 418, 419, 428, 310/429, 430
See application file for complete search history.

(56) References Cited

U.S. PATENT DOCUMENTS

| | | | | |
|---|---|---|---|---|
| 4,663,553 | A * | 5/1987 | Zimmermann | H02K 1/185 29/596 |
| 4,845,394 | A * | 7/1989 | Kleinhans | H02K 9/18 310/64 |
| 4,975,613 | A * | 12/1990 | Brem | H02K 1/185 310/216.016 |
| 5,023,501 | A * | 6/1991 | Zimmermann | H02K 1/185 29/596 |
| 7,362,027 | B2 | 4/2008 | Fichtner et al. | |
| 7,777,374 | B2 | 10/2010 | Ressel | |
| 7,923,871 | B2 | 4/2011 | Weiss | |
| 8,026,643 | B2 | 9/2011 | Weiss | |
| 8,283,817 | B2 | 10/2012 | Weiss et al. | |
| D672,311 | S | 12/2012 | Labermeier et al. | |
| 8,405,261 | B2 | 3/2013 | Hümer et al. | |
| 8,519,580 | B2 | 8/2013 | Brandl et al. | |
| 8,614,528 | B2 | 12/2013 | Eichinger et al. | |
| 8,810,087 | B2 | 8/2014 | Dorr | |
| 2004/0084974 | A1 * | 5/2004 | Nelson | H02K 9/04 310/58 |
| 2004/0119346 | A1 * | 6/2004 | Schleussinger | H02K 9/12 310/58 |
| 2006/0284502 | A1 * | 12/2006 | Lu | H02K 5/15 310/89 |
| 2007/0170788 | A1 | 7/2007 | Werner | |
| 2013/0270939 | A1 | 10/2013 | Brandl et al. | |
| 2014/0028124 | A1 | 1/2014 | Noack et al. | |
| 2014/0103756 | A1 | 4/2014 | Grillenberger et al. | |

FOREIGN PATENT DOCUMENTS

| | | | |
|---|---|---|---|
| DE | 10 2005 047 445 A1 | 4/2007 | |
| DE | 10 2010 001 488 A1 | 8/2011 | |
| DE | 10 2010 064 010 A1 | 6/2012 | |
| EP | 0 690 546 A2 | 1/1996 | |
| GB | 849832 A * | 9/1960 | ............ H02K 1/28 |
| JP | 2011/030304 A | 2/2011 | |
| JP | 2011030304 A * | 2/2011 | |
| SU | 111717 A1 | 11/1957 | |

* cited by examiner

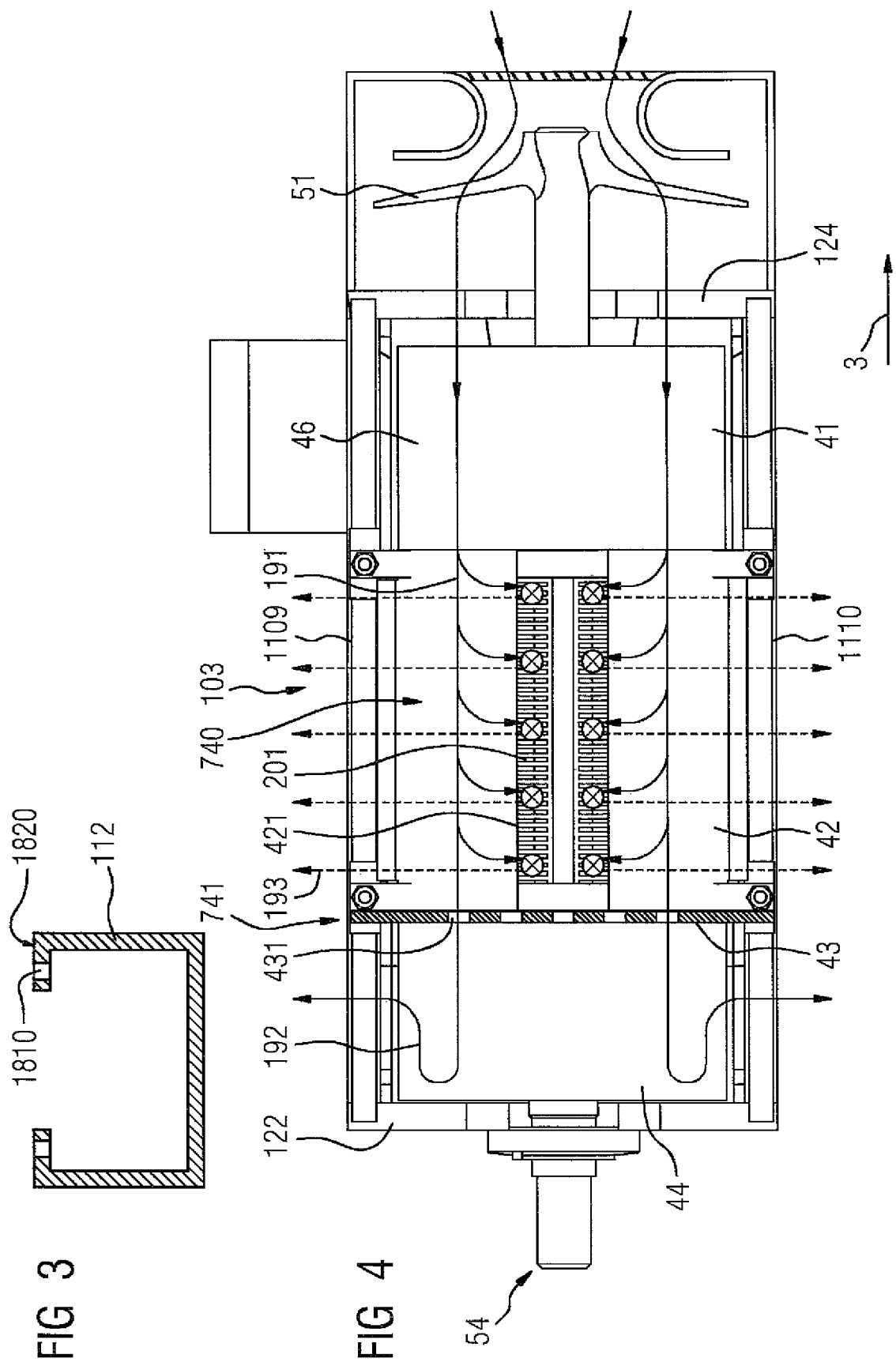

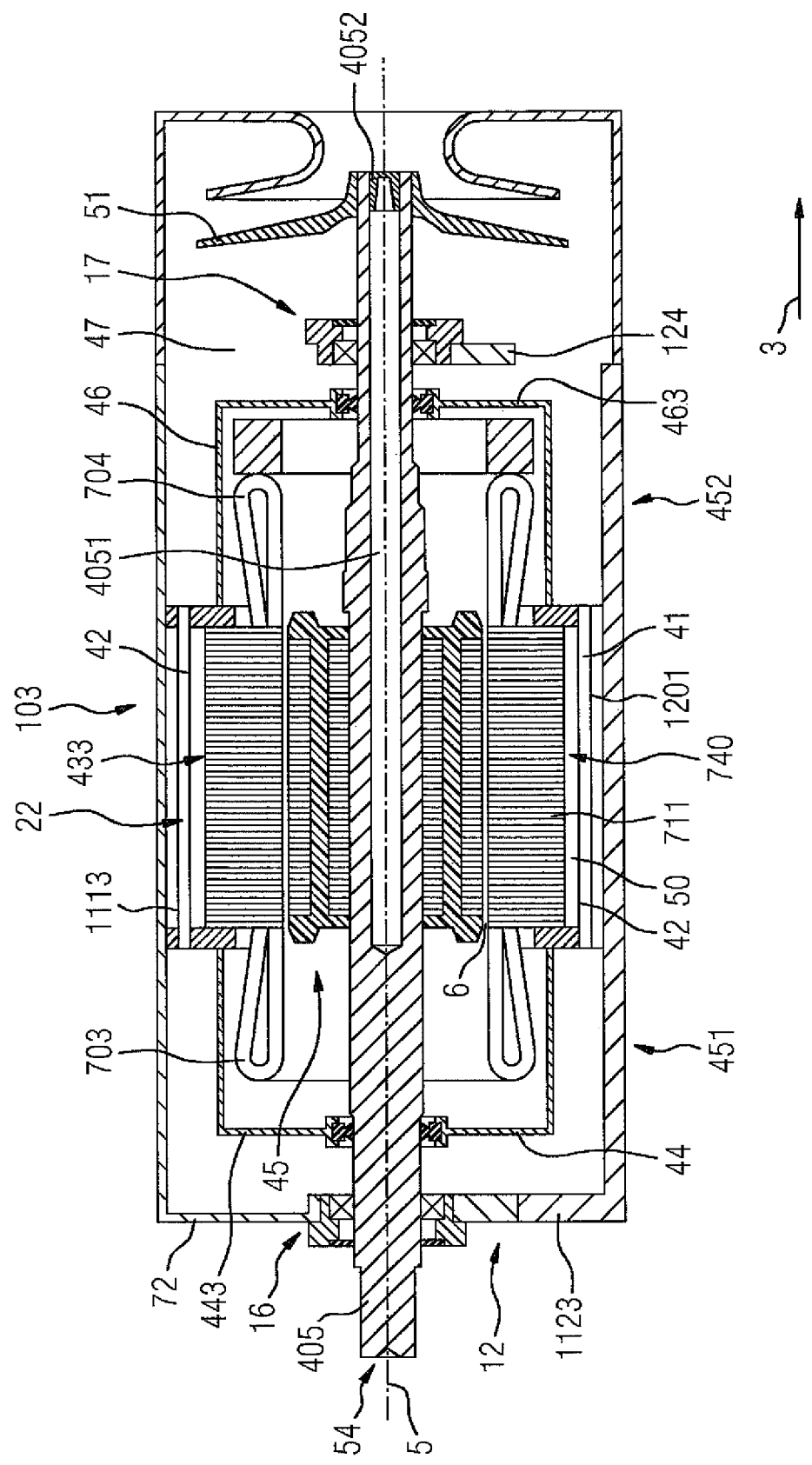

ELECTRICAL MACHINE HAVING A FRAME AND SLEEVE

CROSS-REFERENCES TO RELATED APPLICATIONS

This application is the U.S. National Stage of International Application No. PCT/EP2014/053023, filed Feb. 17, 2014, which designated the United States and has been published as International Publication No. WO 2015/120914.

BACKGROUND OF THE INVENTION

The invention relates to an electrical machine comprising
 a rotor which is rotatably mounted about a rotational axis, said rotational axis extending in an axial direction,
 a stator which extends along the rotational axis from a first axial end to a second axial end of the stator, and interacts with the rotor across an air gap during operation of the electrical machine,
 an interior chamber, the stator and the rotor being situated therein, and
 a sleeve which has a first device that at least partly surrounds the interior chamber.

The invention further relates to a series of electrical machines, comprising corresponding electrical machines, a frame for the electrical machine, a sleeve for the electrical machine, and to a method for servicing the electrical machine and a method for producing the electrical machine.

Such electrical machines are disclosed in DE 10 2010 064 010 A1. In addition to the known electrical machines which use gaseous cooling media, in particular air, the cited publication describes an electrical machine in which a shaft of the rotor is designed as a hollow shaft through which a liquid cooling medium can flow. It describes an exemplary embodiment of an electrical machine which has a main body comprising at least one stand. If applicable, the main body can comprise further elements in addition to the stand, e.g. a housing in which the shaft of the rotor is mounted in bearings. The shaft of the rotor may be embodied as a hollow shaft if required. It is possible in principle to feed the liquid cooling medium in at one axial end of the shaft of the rotor, and to let it out at the other axial end. The liquid coolant can also flow axially in an internal pipe first, and then flow back in the opposite direction in an intermediate chamber between shaft and internal pipe. The supply of the liquid cooling medium to the shaft of the rotor may be effected axially or radially.

A further such electrical machine is disclosed in DE 10 2010 001 488 A1. Described therein is an electrical machine having a stator with a cooling circuit containing a liquid coolant, and a rotor comprising a thermosiphon with an evaporator and at least one condenser. The condenser is attached to the cooling circuit for the purpose of removing the heat from the rotor. In the case of the exemplary embodiment described therein, the stator of the electrical machine is cooled by means of a cooling circuit containing a liquid coolant, e.g. water.

Furthermore, such an electrical machine is also disclosed in the publication JP 2011-030304 A. The electrical machine described therein has a baseframe which comprises a bearing for supporting the rotor, a stator mounting plate for installation of the stator, and a bearing mounting plate for installation of the bearing. The stator is installed on the stator mounting plate and the bearing is installed on the bearing mounting plate. In the case of said electrical machine, the vertical distance from the center of the stator to the stator mounting plate of the baseframe is less than the external radius of the stator. The distance between the baseframe and the center of the stator and the distance between baseframe and the bearings are thereby reduced and the structural rigidity is thereby improved. Displacement and oscillation of the stator center and the rotor center are therefore reduced in the electrical machine. Since connecting parts between the stator mounting plate, a bottom plate, a vertical plate, a strengthening plate, the bearing mounting plate, a cover, side plates and subdivisions are made secure by means of welding, the rigidity of the baseframe is increased and therefore the stator center and the shaft are barely displaced. The cover is designed in the shape of a ship's bottom and secured to the connecting parts of the baseframe by means of welding. The rigidity of the baseframe is thereby further improved. The cover prevents any distribution of an airstream into a free space, said free space being unpredictable due to varying installation sites of the electrical machine. The airstream serves to cool the electrical machine, wherein a laminated core of the stator has correspondingly spaced channels for the purpose of cooling. A fan pushes air as a coolant through the rotating rotor. The air then flows through the channels in a radial direction from an inner side to an outer side of the stator.

JP 2011-030304 A suggests a further type of electrical machine, though this is not described in detail due to the lack of reference to the subject matter of the Japanese publication. This type of electrical machine has a housing in the form of a box or cylinder in which the stator is located and the bearing for the rotor is installed. This is possible because the housing for this type of electrical machine has sufficient rigidity to support the weight of the stator and the rotor.

SUMMARY OF THE INVENTION

Taking this knowledge as a starting point, the object of the invention is to make an electrical machine available in an economical and high-quality manner.

According to one aspect of the invention, the object is achieved by an electrical machine which includes:
 a rotor which is rotatably mounted about a rotational axis, said rotational axis extending in an axial direction,
 a stator which extends along the rotational axis from a first axial end to a second axial end, and interacts with the rotor across an air gap during operation of the electrical machine,
 an interior chamber, the stator and the rotor being situated therein,
 a sleeve which has a first device that at least partly surrounds the interior chamber,
 a frame which defines an extent of the interior chamber in a radial plane, having a first axial frame part, a first radial frame part, a second axial frame part and a second radial frame part, wherein the radial plane is defined by the axial direction and a first radial direction which extends perpendicularly relative to the axial direction, and
 a dividing device on the frame,
 wherein the stator has a fastening device by means of which the stator is fastened to the frame,
 wherein the rotor at its first axial end is rotatably mounted about the rotational axis in a first bearing device on the frame,
 wherein the rotor at its second axial end is rotatably mounted about the rotational axis in a second bearing device on the frame, wherein the interior chamber outside of the radial plane and outside of parallel planes can be made accessible by the dividing device, wherein the parallel planes cut the frame and run parallel to the radial plane.

According to another aspect of the invention, the object is also achieved by a series of electrical machines which includes at least one first electrical machine as per a first embodiment of an electrical machine according to the invention, and a second electrical machine, in particular as per a second embodiment of an electrical machine according to the invention.

According to another aspect of the invention, the object is achieved by a frame for an electrical machine according to the invention, which frame has the first and second axial frame parts, and the first and second radial frame parts.

According to another aspect of the invention, the object is achieved by a sleeve for an electrical machine according to the invention, which sleeve includes the first device.

According to another aspect of the invention, the object is achieved by a method for servicing an electrical machine. As part of an inventive method for servicing an electrical machine according to the invention, the interior chamber outside of the radial plane and outside of the parallel planes is made accessible by the dividing device.

According to another aspect of the invention, the object is achieved by a method for producing an electrical machine according to the invention, with the electrical machine being produced with an interior chamber which can be made accessible outside of the radial plane and the parallel planes by the dividing device.

An electrical machine according to the invention advantageously achieves the object by virtue of the fact that the frame and the dividing device impose few design conditions on units of the electrical machine, at least outside of the radial plane and planes parallel thereto. Thus an electrical machine according to the invention can advantageously comprise the units, with their specific functions and interaction, in an economical and high-quality manner. Furthermore, the frame can advantageously strengthen the specific functions of the units and their interaction. For the purpose of increased productivity throughout the product lifecycle of an electrical machine according to the invention, the dividing device is advantageously present on the frame, allowing access to the interior chamber outside of the radial plane and outside of parallel planes, such that the interior chamber outside of the radial plane and outside of the parallel planes can be made accessible by the dividing device.

The air gap is delimited by stator and rotor in radial directions perpendicular to the axial direction. The rotor can have an entity which allows magnetic interaction via the air gap with the stator, in particular with a winding which is secured to the stator. The stator winding heads are arranged at the first axial end and the second axial end of the stator, and constitute part of the winding, preferably a plurality of windings, which is or are secured to the stator.

The radial plane divides a space into two parts, a first part of the space and a second part of the space. In the interior chamber of an electrical machine according to the invention, the radial plane divides the interior chamber into two parts, a first part of the interior chamber and a second part of the interior chamber. A tangential direction extends perpendicularly relative to the axial direction and perpendicularly relative to one of the radial directions. The radial directions extend from the rotational axis in cross-sectional planes, the axial direction being perpendicular to these.

When an electrical machine according to the invention is operated as a generator, the rotor is caused to rotate about the rotational axis by means of mechanical energy. As a result of the magnetic interaction between rotor and stator, the mechanical energy can be converted into electrical energy. The electrical energy can be drawn off at the winding, this being secured to the stator, for an electrical load.

When an electrical machine according to the invention is operated as a motor, electrical energy is supplied via the winding and electrical energy and is converted into mechanical energy by the magnetic interaction between stator and rotor. In this case, the rotor is caused to rotate about the rotational axis and mechanical energy in the form of rotational movement can be output to a mechanical load at a shaft.

The rotor can have the shaft which is to be rotatably mounted in the first and the second bearing device.

The stator can have a laminated core comprising laminations that are stacked in the axial direction from the first axial end to the second axial end of the stator. The laminations which are stacked in the axial direction can be used to guide the magnetic flux during the operation of an electrical machine according to the invention.

The rotor can have a laminated core comprising laminations that are stacked in the axial direction from the first axial end to the second axial end. The laminations which are stacked in the axial direction can also be used in the case of the rotor to guide the magnetic flux during the operation of an electrical machine according to the invention, in order to restrict losses caused by the alternating magnetic field during the operation of an electrical machine according to the invention.

The stator, being fastened to the frame, advantageously has the fastening device for supporting the stator on the frame during operation of the electrical machine.

For this purpose, the fastening device can advantageously have fastening units, wherein the stator is fastened against movement about the rotational axis by means of said fastening units.

The fastening device can advantageously have fastening units, wherein the stator is secured to the frame by means of said fastening units.

The fastening units allow the stator to be fastened or secured to the frame in a high-quality and economical manner, in particular by virtue of a spatial distribution of the fastening units.

An inventive series of electrical machines has the further advantage that the first electrical machine and the second electrical machine can advantageously be provided in a simple manner by advantageously adding, removing or exchanging units or devices of an electrical machine according to the invention. This is advantageously possible inter alia by virtue of the fact that the interior chamber can be made accessible outside of the radial plane and outside of the parallel planes by the dividing device.

An inventive frame also has the further advantage that the frame can be used for different electrical machines. Moreover, the frame advantageously allows the stator to be fastened and the rotor to be mounted about the rotational axis in the first and second bearing devices on the frame. An assembled unit of the inventive electrical machine can also advantageously comprise the frame with stator and rotor.

An inventive sleeve for an electrical machine according to the invention also has the further advantage that it can have an economical design. It is advantageously possible inter alia to produce the first device for an electrical machine according to the invention in an economical manner because advantageously no demanding requirements are placed on centering units of the first device. Even in an economical design, the sleeve can satisfy further functions for the electrical machine according to the invention.

When servicing an electrical machine, tasks are performed on the electrical machine. Said servicing comprises tasks which are performed after setting up the electrical machine at an installation site, usually after initial operation of the electrical machine, at the installation site or in the vicinity of the installation site.

A method according to the invention for servicing an electrical machine according to the invention also has the further advantage that, by virtue of the advantageous accessibility of the interior chamber when servicing an electrical machine according to the invention, advantageously few demands have to be placed on the installation site in respect of space needed for the service. Therefore the servicing of an electrical machine according to the invention can be performed in an economical and high-quality manner.

A method according to the invention for producing an electrical machine according to the invention also has the further advantage that, during the production of an electrical machine according to the invention, there are advantageously few dependencies between the production steps of the individual units of an electrical machine according to the invention. The inventive production of an electrical machine according to the invention can therefore be effected in an economical and high-quality manner, since few or no waiting times occur. Assembly of a first unit of an electrical machine according to the invention with a second unit of an electrical machine according to the invention can also take place without demanding requirements relating to centering devices between the first and the second unit.

Advantageous embodiments of the invention are specified in the dependent claims.

In an advantageous embodiment of an electrical machine according to the invention, the dividing device has a first dividing device between the first device of the sleeve and the frame, with detachable contact points for removing the first device of the sleeve from the frame. It is then advantageously possible to make the first part of the interior chamber accessible outside of the radial plane and outside of the parallel planes by virtue of the dividing device comprising the first dividing device between the first device of the sleeve and the frame, specifically by detaching the detachable contact points from each other. The detachable contact points are situated in a dividing unit of the first dividing device, wherein the frame comprises one part of the dividing unit. It is thereby possible make an electrical machine according to the invention available in an economical and high-quality manner throughout the product lifecycle.

The first dividing device can advantageously have a plurality of dividing units comprising detachable contact points, in order to fasten the first device to the frame.

In a further advantageous embodiment of an electrical machine according to the invention, the first device of the sleeve surrounds the interior chamber, at least from the first to the second axial end of the stator. It is therefore possible in an advantageously economical manner, by means of the dividing device on the frame, to make a tangential surface of the stator and fastening units of a fastening device accessible outside of the radial plane and outside of the parallel planes.

In a further advantageous embodiment of an electrical machine according to the invention, the frame has a securing device for securing the frame to a flange for operation of the electrical machine, wherein the rotational axis extends in a vertical direction. It is therefore possible in an advantageously economical manner, by means of removing the first device of the sleeve and optionally a second device of the sleeve, to make the interior chamber accessible outside of the radial plane and outside of the parallel planes without having to remove the electrical machine from the flange. It is therefore possible at an installation site for a machine according to the invention to remain installed on the flange of another machine which is driven by or drives an electrical machine according to the invention. It is thereby possible to make an electrical machine according to the invention available in an economical and high-quality manner throughout the product lifecycle.

The electrical machine can have a flange device which is secured to the stator and to the frame. In this way, the flange device can advantageously support the stator against a force due to weight which acts on the stator, and the interior chamber can advantageously be made accessible by removing the first device of the sleeve and optionally a second device of the sleeve.

In a further advantageous embodiment of an electrical machine according to the invention, the first device surrounds the interior chamber on a first side of the frame, at least from the first to the second radial frame part. It is therefore possible in an advantageously economical manner to make the first part of the interior chamber accessible outside of the radial plane and outside of the parallel planes on the first side of the frame by means of the dividing device on the frame.

In a further advantageous embodiment of an electrical machine according to the invention, the dividing device has a second dividing device comprising detachable contact points for lifting the frame from a second device. It is then advantageously possible to make the second part of the interior chamber accessible outside of the radial plane and outside of the parallel planes by virtue of the dividing device comprising the second dividing device between the second device of the sleeve and the frame, specifically by detaching the contact points from each other. The detachable contact points are situated in a dividing unit of the second dividing device, wherein the frame comprises one part of said dividing unit. It is thereby possible to make an electrical machine according to the invention available in an economical and high-quality manner throughout the product lifecycle. The frame can also form part of the sleeve in an advantageously economical manner.

In a further advantageous embodiment of an electrical machine according to the invention, the second device is a base which is present at an installation site of the electrical machine. An electrical machine according to the invention can therefore utilize the existing arrangements at the installation site in an advantageously economical and high-quality manner, and in particular can advantageously use the existing base.

In a further advantageous embodiment of an electrical machine according to the invention, the sleeve comprises the second device. It is therefore possible in an advantageously economical and high-quality manner to provide an electrical machine according to the invention for various conditions at an installation site. The second device can be produced for an electrical machine according to the invention in an advantageously economical manner, since advantageously no demanding requirements are placed on centering units of the second device.

The second device can advantageously be a transportable device. An electrical machine according to the invention can therefore be delivered to an installation site in an advantageously economical and high-quality manner.

During operation, an electrical machine according to the invention can advantageously convert electrical energy into mechanical energy or vice versa at powers in excess of 160 KW, since an electrical machine according to the invention can advantageously withstand the forces that occur and can satisfy the various conditions at the installation site.

The second device of the sleeve can support the frame as a body comprising the frame, stator and rotor, the weight acting on said body, at least at a dividing face of the second device of the sleeve, wherein a portion of the weight acts on the dividing face perpendicularly relative to the at least one dividing face. The weight is a force exerted on the frame due to the Earth's gravitational field. It is thereby possible to make an electrical machine according to the invention available in an economical and high-quality manner throughout the product lifecycle, if said electrical machine is to be set up in such a way that the rotational axis extends in a horizontal direction at an installation site without a suitable base.

In a further advantageous embodiment of an electrical machine according to the invention, the second device comprises concrete. The advantageous properties of concrete, e.g. polymer concrete, mineral casting or cement concrete, can be used advantageously for an electrical machine according to the invention. This is advantageously possible because, outside of the radial plane and the parallel planes, an electrical machine according to the invention places few design conditions on the second device. This is also advantageously possible because, during the inventive production of an electrical machine according to the invention, there are few dependencies between the production steps for the individual units. This means that e.g. reworking of individual units is advantageously infrequent when assembling the electrical machine. It is likewise advantageously possible to utilize the significant extent to which concrete can be molded, such that reworking of the concrete is advantageously largely superfluous. It is thereby possible to make an electrical machine according to the invention available in an economical and high-quality manner throughout the product lifecycle.

In a further advantageous embodiment of an electrical machine according to the invention, the dividing device has a third dividing device comprising detachable contact points for removing an outer partial guide device from the frame. It is then advantageously possible to make the second part of the interior chamber accessible outside of the radial plane and outside of the parallel planes by virtue of the dividing device comprising the third dividing device between the outer partial guide device and the frame, specifically by detaching the contact points from each other. The detachable contact points are situated at a dividing unit of the third dividing device, wherein the frame comprises one part of the dividing unit. It is thereby possible to make an electrical machine according to the invention available in an economical and high-quality manner throughout the product lifecycle. The outer partial guide device in an electrical machine according to the invention can advantageously be designed, for the purpose of guiding a coolant flow in the interior chamber, in a shape which is advantageous for a specific electrical machine according to the invention, for a specific series according to the invention and/or for a specific installation site, or, in the case of an electrical machine according to the invention or a specific installation site, need not be secured to the frame if this is not required for cooling the electrical machine according to the invention. The outer partial guide device can advantageously be produced from a thin material. It is then possible in an advantageously economical manner using only modest forces to shape the thin material into the desired shape of the outer partial guide device for guiding the coolant flow.

In a further advantageous embodiment of an electrical machine according to the invention, a terminal box is secured to the frame for the purpose of laying a lead from the stator via the frame to the terminal box. This advantageously ensures that neither the servicing nor the production of an electrical machine according to the invention is greatly hampered by the lead. It is thereby possible to make an electrical machine according to the invention available in an economical and high-quality manner throughout the product lifecycle.

A further advantageous embodiment of an electrical machine according to the invention has an isolating unit between the sleeve and the frame. It is thereby possible in an advantageously economical manner to achieve a reduction in the stimulation of vibrations or unwanted forces that occur at an installation site when an electrical machine is operated. Inter alia, a seating face of the isolating unit can be provided in an advantageously economical and space-saving manner on the frame and the first device or a second device of the sleeve. The first device or the second device can advantageously have a recess for this purpose, wherein said recess is adjacent to the frame and can accommodate the isolating unit. It is then advantageously possible to take the desired reduction in the stimulation of vibrations and undesired forces into consideration already during the production of an electrical machine according to the invention by incorporating the isolating unit accordingly. Alternatively, it is possible initially to produce an electrical machine according to the invention without incorporating the isolating unit, to commission said electrical machine at the installation site without an isolating unit, and advantageously to adapt the incorporation of the isolating unit subsequently at the installation site and/or in conjunction with another machine when servicing the electrical machine according to the invention. In this way, it is advantageously possible to avoid changing the dimensions of an electrical machine according to the invention. The isolating unit can advantageously have a adjustment device for adjusting its damping behavior. The isolating unit may be embodied as a passive unit or as an active unit having an interface to a closed-loop control system for the activation thereof.

An electrical machine according to the invention may include the isolating unit between the first radial frame part and the sleeve, for the purpose of adjusting the rigidity of the mounting in a region of the first bearing device. It is then advantageously possible to achieve a specific vibration behavior of an electrical machine according to the invention for a specific rotational speed range which is desired at the installation site for operation of an electrical machine according to the invention. It is thereby possible to make an electrical machine according to the invention available in an economical and high-quality manner throughout the product lifecycle.

An electrical machine according to the invention may include isolating units between the first axial frame part and the sleeve. It is thereby possible to achieve a low degree of stress in relation to the other machine which is driven by or drives an electrical machine according to the invention. Said low degree of stress can advantageously be achieved when changing a torque on the shaft. An electrical machine according to the invention may include isolating units between the second axial frame part and the sleeve correspondingly. The first axial frame part can advantageously be mounted on the sleeve, in particular the first or second device, via the isolating units at a first bearing point, and the second axial frame part can likewise be mounted on the sleeve, in particular the first or second device, via the isolating units at a second bearing point, wherein a connection line between the first and the second bearing point runs through the rotational axis. In this way, it is advantageously possible for the torque at the shaft to change without any transverse forces being generated (in an ideal scenario) or with damped transverse forces. The transverse forces are undesired forces which can have a damaging effect, e.g. via the shaft, on the other machine or the electrical machine. In order to reduce the undesired forces, minimization of the undesired forces can be effected in that the fastening device allows the first and second bearing points to be adjusted, wherein this can change a position of the connection line between first and second bearing point relative to the rotational axis. It is thereby possible to make an electrical machine according to the invention available in an economical and high-quality manner throughout the product lifecycle.

In a further advantageous embodiment of an electrical machine according to the invention, the first bearing device on the frame can be removed from the first radial frame part in a second radial direction perpendicular to the radial plane, and the second bearing device on the frame can be removed from the second radial frame part in the second radial direction perpendicular to the radial plane. Therefore the stator with the rotor can advantageously be removed from the frame in the second radial direction during a service. During production of an electrical machine according to the invention, the stator with the rotor can advantageously be placed into the frame in the second radial direction. The first bearing device on the frame can be removed from the first radial frame part in a second radial direction perpendicular to the radial plane, if the first radial frame part has a recess for the first bearing device with an opening which can surround a lateral area of the first bearing device in a radial direction. The same applies correspondingly to the second bearing device and the second radial frame part.

In a further advantageous embodiment of an electrical machine according to the invention, the fastening device has an adjustment device for adjusting the air gap by changing a position of the stator, which is fastened to the frame, relative to the frame. It is therefore advantageously possible, using the fastening device made advantageously accessible in the interior chamber, to effect the adjustment of the air gap in a high-quality and economical manner even after the installation of an electrical machine according to the invention at the installation site.

The fastening device can have fastening units which comprise adjustment devices for adjusting the air gap by changing a position of the stator, which is fastened to the frame, relative to the frame. It is thereby possible in an advantageously economical manner to effect the adjustment of the air gap in an axial direction over a length of the air gap.

In a further advantageous embodiment of an electrical machine according to the invention, the fastening device comprises a stiffening element which runs in an axial direction and is provided for the purpose of stiffening the stator. It is thus possible to maintain a gap width of the air gap between rotor and stator in an axial direction over a length of the air gap in an economical and high-quality manner.

In a further advantageous embodiment of an electrical machine according to the invention, the stiffening element comprises a fastening unit of the fastening device. It is thus possible to produce the fastening device in an economical and high-quality manner. In particular, this applies if part of the fastening unit is materially connected to the stiffening element.

In a further advantageous embodiment of an electrical machine according to the invention, the stiffening element runs within a lateral area of the stator as viewed in an axial direction. Therefore a flow of coolant on a tangential surface of the stator in an axial direction and in a tangential direction is only influenced slightly by the stiffening element. The modest influence of the stiffening element on the axial or tangential coolant flow means that little energy is required to generate the axial or tangential flow, and that cooling of the electrical machine can be adapted to the installation site. It is thereby possible to make an electrical machine according to the invention available in an economical and high-quality manner throughout the product lifecycle.

In a further advantageous embodiment of an electrical machine according to the invention, the stiffening element can guide a coolant out of the stator in a radial direction perpendicular to the axial direction. It is thereby possible to make an electrical machine according to the invention available in an economical and high-quality manner throughout the product lifecycle.

The stiffening element can advantageously also guide the coolant in an axial direction. The stiffening element can thus reduce any mixing of coolant flows which flow in a tangential direction for the purpose of cooling the stator at the tangential surface. This makes it possible to achieve advantageously improved cooling while requiring little energy to generate the coolant flows. It is thereby possible to make an electrical machine according to the invention available in an economical and high-quality manner throughout the product lifecycle.

In a further advantageous embodiment of an electrical machine according to the invention, an outer guide device is secured to the first device. This allows a coolant flow to be guided in an advantageously economical manner and the interior chamber to be made advantageously accessible outside of the radial plane and outside of the parallel planes by means of the dividing device, since removal of the first device of the sleeve from the frame automatically includes removal of the outer guide device. It is thereby possible to make an electrical machine according to the invention available in an economical and high-quality manner throughout the product lifecycle. The outer guide device can also advantageously be produced from a thin material. It is then possible in an advantageously economical manner to shape the thin material using only modest forces into the desired shape of the outer guide device for guiding the coolant flow.

Various first devices can advantageously be implemented for various cooling schemes, and one of the various first devices can advantageously be selected and mounted on the frame for a specific electrical machine according to the invention. The various first devices may comprise outer guide devices which have the effect of guiding or separating a coolant flow or a plurality of coolant flows in an axial, radial or tangential direction, and/or separating one coolant flow from another coolant flow in an axial, radial or tangential direction. Said guidance or separation may include interaction with a stator in this case. For example, the stator can be a stator where the air flows in a radial direction via channels of the stator from an inner side to an outer side of the stator.

The first device can also advantageously have a heat exchanger in which waste heat of an electrical machine according to the invention is discharged from the coolant flow to a separate outer coolant flow in the heat exchanger, which carries the waste heat out of the electrical machine according to the invention.

In a further advantageous embodiment of an electrical machine according to the invention, the stator has a flow arrangement for cooling the electrical machine. Therefore the flow arrangement can advantageously be made accessible outside of the radial plane and the parallel plane by the dividing device for the purpose of servicing and producing an electrical machine according to the invention, and the cooling of the electrical machine can advantageously also take place at the stator in an economical and high-quality manner. By virtue of the advantageous accessibility of the stator with the flow arrangement, tasks can be performed on the flow arrangement during the servicing or production of an electrical machine according to the invention, particularly in the region of a tangential surface, in an economical and high-quality manner throughout the product lifecycle.

The flow arrangement can have recesses on an outer surface of the stator. It is therefore advantageously easy to clean the recesses for guiding a coolant flow by wiping the outer surface of the stator, wherein the outer surface of the stator can advantageously be made accessible by virtue of the dividing device between the sleeve and the frame. It is thereby possible to make an electrical machine according to the invention available in an economical and high-quality manner throughout the product lifecycle.

The flow arrangement can have pipe sections for cooling the stator. The accessibility of the interior chamber with the stator can advantageously be provided in an economical and high-quality manner not only for flow arrangements containing a gaseous coolant, e.g. air, but also for flow arrangements containing a liquid coolant. When servicing or producing an electrical machine according to the invention, it is advantageously possible to perform a visual inspection of the pipe sections and the connections between the pipe sections for any leakage at the pipe sections or the connections. By virtue of the advantageous access to the interior chamber outside of the radial plane and outside of parallel planes in the case of a rotor shaft which is designed as a hollow shaft and through which a liquid cooling medium flows, it is also advantageously possible to perform a visual inspection of a connection between rotating parts and fixed parts for any leakage.

In a further advantageous embodiment of an electrical machine according to the invention, the flow arrangement has recesses, wherein linear extensions of the recesses run in a plane perpendicular to the axial direction. In the case of an electrical machine according to the invention, it is advantageously easy to provide the recesses in an economical and high-quality manner. Since an electrical machine normally has a longer extent in the axial direction than in the radial direction, a person performing tasks associated with the servicing or production of an electrical machine according to the invention can check, clean and/or repair a comparatively larger portion of a recess in a radial direction than would be possible for a portion of a recess if this extended in an axial direction. In particular, this is advantageous if the linear extensions of the recesses run in tangential directions.

In a further advantageous embodiment of an electrical machine according to the invention, the sleeve on a side of the electrical machine having the first axial frame part has a first opening for cooling the electrical machine, wherein said first opening is connected to a first space which adjoins a tangential surface of the stator. It is therefore advantageously possible for a coolant flow to flow into the electrical machine according to the invention through the first opening, to be guided in a tangential direction over the tangential surface of the stator, and to flow out of an electrical machine according to the invention at an outlet opening. For this purpose, the outlet opening is connected to the first space, this being adjacent to the tangential surface of the stator. Since an extent of the stator in a direction perpendicular to the axial direction is in many cases shorter in than an extent of the stator in an axial direction in an electrical machine, it is advantageously possible to cool the rotor more economically and in a high-quality manner, since the coolant flow in an electrical machine according to the invention only has to cover an advantageously short flow path along the tangential surface of the stator, said surface warming the coolant flow as a result of waste heat from the stator. The flow path of the coolant flow in the first space can also advantageously be shortened by providing a plurality of consecutive openings in a tangential direction, as inflow or outflow openings for the coolant flow, on the sleeve between the side having the first axial frame part and a side having the second axial frame part.

The sleeve can have a second opening on that side of the electrical machine having the second axial frame part, wherein the second opening is connected to the first space adjoining the tangential surface. A coolant can therefore flow through the first opening into the first space, absorb the waste heat from the stator at the tangential surface of the stator, and leave an electrical machine according to the invention using an the advantageously short path via the second opening in an advantageously economical and high-quality manner for an electrical machine according to the invention. In this case, a boundary of the first or second opening can advantageously be formed by a recess in the sleeve and the first or second axial frame part respectively. It is thereby possible to make an electrical machine according to the invention available in an economical and high-quality manner throughout the product lifecycle.

The first space can have baffle devices at the first and second axial end of the stator. The baffle devices advantageously route the coolant flow in tangential directions over the tangential surface of the stator.

In a further advantageous embodiment of an electrical machine according to the invention, the sleeve on that side of the electrical machine having the first axial frame part has a further first opening for cooling the electrical machine, wherein the first axial frame part is situated between the first opening and the further first opening. It is thereby possible in an advantageously economical manner to divide a coolant flow into a first tangential coolant flow, which can flow into the first space through the first opening, and a second tangential coolant flow, which can flow into the first space through the second opening. The further first opening is advantageously connected to a further second opening via an adjacent second space, wherein the second axial frame part is situated between the second opening and the further second opening. The second tangential coolant flow can advantageously flow into the second space via the further first opening. The tangential surface of the stator has a first part that is situated in the first part of the interior chamber, and a second part that is situated in the second part of the interior chamber. The stator can therefore advantageously be cooled over the first part of the tangential surface by the first tangential coolant flow and over the second part of the tangential surface by the second tangential coolant flow.

In a further advantageous embodiment of an electrical machine according to the invention, the sleeve on that side of the electrical machine having the second radial frame part has a first axially oriented opening for cooling the electrical machine, said opening being connected to an axial flow space. It is then possible in an advantageously space-saving manner to arrange a fan on that side of the electrical machine having the second radial frame part, wherein said fan can convey a coolant flow through all of the axially oriented opening.

In a further advantageous embodiment of an electrical machine according to the invention, a guide device is arranged between the axial flow space and the first space in the interior chamber of the electrical machine. In this way, it is advantageously possible to achieve a modest degree of intermixing between the colder coolant in the axial flow space and the warmer coolant in the first space. Therefore cooling of the electrical machine advantageously requires little energy. It is thereby possible to make an electrical machine according to the invention available in an economical and high-quality manner throughout the product lifecycle. For this purpose, it is moreover advantageously possible to secure the guide device to the stator using detachable connection elements. When servicing an electrical machine according to the invention, it is therefore advantageously easy to clean recesses for guiding a coolant flow over an outer surface of the stator by wiping the outer surface of the stator after the connection elements have been released and the guide device has been removed.

The guide device can have a passage arrangement for a coolant in the axial direction along the tangential surface. Therefore a colder coolant can advantageously be guided from the axial flow space more uniformly along the stator in the axial direction into the first space at the tangential surface of the stator. It is then advantageously possible to achieve a more uniform temperature distribution of the coolant in the axial flow space and in the first space in an axial direction. This results in advantageously improved cooling while requiring little energy in the case of an electrical machine according to the invention.

In a further advantageous embodiment of an electrical machine according to the invention, a baffle device is arranged at the first axial end of the stator in the interior chamber. An axial coolant flow can therefore be converted in a space-saving manner into two tangential partial flows of large width, wherein said width can correspond to the length of the tangential surface of the stator in an axial direction, and the two tangential partial flows can be directed on a short flow path over the tangential surface of the stator for the cooling thereof. It is thereby possible to make an electrical machine according to the invention available in an economical and high-quality manner throughout the product lifecycle.

The baffle device can be a first axial boundary of the axial flow space at the first axial end of the tangential surface. The baffle device can therefore consist in an economical and high-quality manner of mainly a single plate.

The baffle device can be arranged at the first axial end of the stator and have an opening as a passage from the first axial flow space for the cooling of stator winding heads. It is therefore advantageously possible to take an adequate quantity of coolant flow from the axial flow space for the stator winding heads.

The baffle device can delimit a first portion of the interior chamber from a remaining interior chamber, wherein a part of the tangential surface of the stator lying between the stator winding heads is situated in the remaining interior chamber, and the sleeve has an opening for cooling the first part of the interior chamber, wherein the stator winding heads extend into the first portion of the interior chamber. The stator winding heads can therefore advantageously be cooled by a coolant flow which leaves an electrical machine according to the invention through the sleeve on a different path or which flows in through said sleeve as the coolant that flows along the part of the tangential surface of the stator lying between the stator winding heads. This results in advantageously improved cooling while requiring little energy in the case of an electrical machine according to the invention.

In a further advantageous embodiment of an electrical machine according to the invention, the guide device extends in the axial direction, at least from a first axial end of a winding of the stator to a second axial end of the winding of the stator, said guide device being arranged between the axial flow space and the first space in the interior chamber of the electrical machine. It is then advantageously possible to achieve a more uniform temperature distribution of the coolant from the first axial end of the winding of the stator to the second axial end of the winding of the stator, in the axial flow space and in the first space, and to guide a colder coolant from the axial flow space more uniformly along the stator, i.e. from the first axial end of the winding of the stator to the second axial end of the winding of the stator, in the axial direction into the first space at the tangential surface of the stator. Therefore cooling of the electrical machine advantageously requires little energy. It is thereby possible to make an electrical machine according to the invention available in an economical and high-quality manner throughout the product lifecycle.

In a further advantageous embodiment of an electrical machine according to the invention the stator has a first and a second protective tube, wherein the first protective tube is secured between the first radial frame part and the first axial end of the stator, and the second protective tube is secured between the second axial end of the stator and the second radial frame part. It is therefore advantageously possible to provide an assembled unit comprising frame, stator, rotor, first and second protective tube in an economical and high-quality manner.

The first and second protective tubes can advantageously be secured to the stator for the purpose of servicing or producing an electrical machine according to the invention, in order to allow the assembled unit to be assembled in an advantageously economical manner.

At its axial end facing the first radial frame part, the first protective tube can have an axial boundary which extends in radial directions to the shaft. It is then advantageously possible to reduce or almost eliminate any penetration of dirt particles into the air gap in an axial direction. It is thereby possible to make an electrical machine according to the invention available in an economical and high-quality manner throughout the product lifecycle. The second protective tube can advantageously have a corresponding axial boundary.

In a further advantageous embodiment of an electrical machine according to the invention, an opening of the first protective tube is connected via an overflow channel to an opening of the second protective tube. It is thereby possible in an advantageously economical and high-quality manner to guide a coolant flow, which flows from the first protective tube through the rotor and/or stator into the second protective tube, back into the first protective tube via the overflow channel. In order to effect the flow of the coolant, the rotor can have corresponding conveyor devices. The overflow channel can inter alia be made advantageously accessible by the dividing device on the frame when performing tasks associated with the servicing of an electrical machine according to the invention or during the production of an electrical machine according to the invention. The overflow channel can inter alia advantageously be removed or installed. In the case of an electrical machine according to the invention in which the overflow channel is not yet installed or has been removed, the opening of the first and the second protective tube can advantageously allow visual inspection of or access to parts of an electrical machine according to the invention within the first and second protective tube. It is thereby possible to make an electrical machine according to the invention available in an economical and high-quality manner throughout the product lifecycle.

In a further advantageous embodiment of an electrical machine according to the invention, the rotor has a shaft for rotatably mounting the rotor in the first and second bearing device, wherein the shaft has a hole in the axial direction for transporting waste heat of the electrical machine to a heat dissipation device, wherein the heat dissipation device is situated within the frame at the first or second axial end of the rotor in the axial direction. An assembled unit comprising stator, rotor and frame can therefore include a cooling device in an advantageously compact manner, wherein said cooling device can comprise the hole and the heat dissipation device. Furthermore, a coolant flow which absorbs waste heat from the heat dissipation device is advantageously hampered only slightly by the frame outside of the radial plane and the parallel planes. It is thereby possible to make an electrical machine according to the invention available in an economical and high-quality manner throughout the product lifecycle.

In a further advantageous embodiment of an electrical machine according to the invention, the rotor has a shaft for rotatably mounting the rotor in the first and second bearing device, wherein the shaft has a hole in an axial direction for transporting waste heat of the electrical machine to a heat dissipation device, said heat dissipation device being situated outside the frame in the axial direction. Since the frame also allows cooling of the first and second bearing device by means of the coolant which flows over the first and second bearing device outside of the radial plane and the parallel plane, and particularly in an axial direction, the first or second bearing device via which waste heat is transported outside the frame in the axial direction can be cooled more effectively and therefore protected against heating which could cause damage. It is thereby possible to make an electrical machine according to the invention available in an economical and high-quality manner throughout the product lifecycle.

In an embodiment of a method according to the invention for producing an electrical machine according to the invention, a method step provides for the rotor to be positioned in a hole of the stator, a further method step provides for the stator with the rotor to be transported to the frame, the rotor being supported by the stator. In a method step following thereupon, the stator with the rotor is placed in the frame. In a further method step following thereupon, the stator is fastened to the frame by means of the fastening units and the first and the second bearing device are fastened. After fastening the stator and the first and second bearing device to the frame, it is then advantageously possible to carry out a visual inspection in an axial direction along the stator for possible damage. It is thereby possible economically to provide an electrical machine according to the invention in a high-quality manner.

In a further method step following thereupon, the air gap which is present between the rotor and stator in radial directions in the hole can advantageously be adjusted by means of the adjustment device. Assembly of the stator, rotor, frame, first and second bearing device of an electrical machine according to the invention can advantageously take place without demanding requirements in relation to centering devices, since the air gap can advantageously be adjusted by the adjustment device after fastening the stator and the first and second bearing device to the frame.

In an embodiment of a method according to the invention for servicing an electrical machine according to the invention, the first device of the sleeve of the electrical machine according to the invention is removed therefrom. If said servicing requires access to the second part of the interior chamber of the electrical machine according to the invention, the frame with the stator and the rotor is lifted from a second device of the sleeve.

Advantageous embodiments of inventive electrical machines, inventive series of electrical machines, inventive frames, inventive sleeves, inventive methods for servicing an electrical machine and inventive methods for producing an electrical machine are advantageously derived by combining individual or multiple features described above. In the case of inventive series of electrical machines, an inventive series comprises inventive electrical machines which differ from each other in respect of individual or multiple features described above.

BRIEF DESCRIPTION OF THE DRAWING

The properties, features and advantages of the invention as described above, and the manner in which these are achieved, are clearer and easier to understand in the context of the following description of the exemplary embodiments, these being explained with reference to the figures, in which:

FIG. 3 shows a section perpendicular to the axial direction through a second device of the sleeve of the first exemplary embodiment of an electrical machine, FIG. 4 shows a view of a top side of a third exemplary embodiment of an electrical machine, looking through a first device of a sleeve, FIG. 5 shows a section through the third exemplary embodiment of an electrical machine.

DETAILED DESCRIPTION OF PREFERRED EMBODIMENTS

Figure 1:
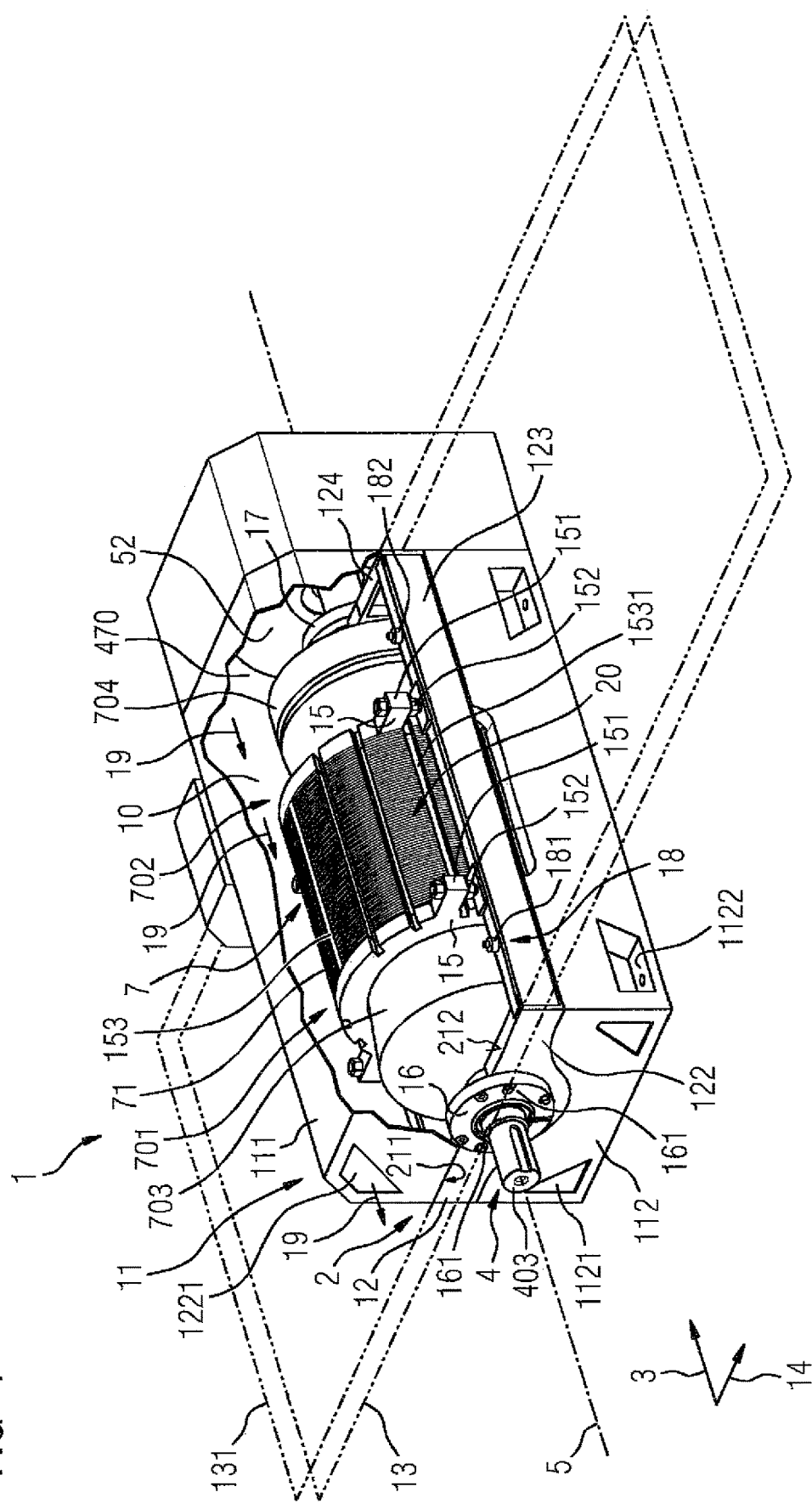
FIG. 1 shows a first exemplary embodiment of an electrical machine.

FIG. 1 shows a first exemplary embodiment of an electrical machine 1 comprising a rotor 4 which is rotatably mounted about a rotational axis 5, said rotational axis 5 extending in an axial direction 3. The electrical machine 1 further comprises a stator 7 which extends along the rotational axis 5 from a first axial end 701 to a second axial end 702 of the stator 7 and interacts with the rotor 4 across an air gap 6 during operation of the electrical machine 1, an interior chamber 10, the stator 7 and the rotor 4 being situated in said interior chamber 10, and a sleeve 11 which has a first device 111 that at least partly surrounds the interior chamber 10. In addition, the electrical machine 1 has a frame 12 which defines an extent of the interior chamber 10 in a radial plane 13, having a first axial frame part 123, a first radial frame part 122, a second axial frame part 121 and a second radial frame part 124, wherein the radial plane 13 is defined by the axial direction 3 and a first radial direction 14 which extends perpendicularly relative to the axial direction. In addition, the electrical machine 1 comprises a dividing device 2 on the frame 12. The stator 7 has a fastening device 15 by means of which the stator 7 is fastened to the frame 12. The rotor 4 is rotatably mounted on the frame about the rotational axis 5 in a first bearing device 16 at its first axial end and in a second bearing device 17 at its second axial end. The interior chamber 10 outside of the radial plane 13 and outside of parallel planes 131 can be made accessible by the dividing device 2. The parallel planes 131 cut the frame 12 and run parallel to the radial plane 13.

In FIG. 1, the parallel plane 131 is marked for the purpose of representing the parallel planes. If all the parallel planes cutting the frame 12 are marked in FIG. 1, the stator 7 extends over the parallel planes in a direction perpendicular to the parallel planes and in an opposite direction. In the case of the electrical machine 1, the dividing device 2 has a first dividing device 211,212 between the first device 111 of the sleeve 11 and the frame 12, comprising detachable contact points for removing the first device 111 of the sleeve 11 from the frame 12. The first dividing device 211, 212 in this case comprises a dividing unit which has a dividing face 212 of the frame 12 and a dividing edge 211 on the first device 111. In this way, the first device 111 can be lifted for removal from the frame 12. The detachable contact points between the dividing face 212 and the dividing edge 211 are no longer in contact after the removal of the first device 111 from the frame 12. The stator 7 is thereby made accessible in a first part of the interior chamber 10 above the radial plane 13 and above parallel planes 131. In this case, the frame 12 comprises the dividing face 212 as one part of the dividing unit of the first dividing device 211,212. The fastening device 15 of the stator 7 is then accessible and the air gap 6 can be adjusted, using an adjustment device 152 which is part of the fastening device 15, by changing a position of the stator 7, which is fastened to the frame 12, relative to the frame 12. The fastening device 15 has four fastening units 151, the stator 7 being fastened by means of the fastening units 151 against movement about the rotational axis 5. In the case of the electrical machine 1, the stator 7 is secured to the frame 12 by means of the fastening units 151. The fastening device 15 has a plate at the first axial end 701 and at the second axial end 702 of the stator 7, wherein components of the fastening units 151 are materially connected to the plates. The fastening units 151 fasten the stator 7 at the first and second axial frame part 123, 121 against movement about the rotational axis. For this purpose, the fastening device 15 has two fastening units 151 on a side of the electrical machine 1 having the first axial frame part 121, and two fastening units 151 likewise on a side of the electrical machine 1 having the second axial frame part 123. The four fastening units 151 each have an adjustment device 152. It is thereby possible in an advantageously economical manner to fasten the stator 7 and to adjust the air gap 6 over a length in the axial direction 3. For this purpose, the fastening units 151 are advantageously fixators. The stator 7 has a laminated core comprising laminations 710 that are stacked in the axial direction 3 from the first to the second axial end 701, 702 of the stator 7. The laminations 710 are stacked between the two plates of the fastening device 15 in the axial direction 3. The fastening device 15 comprises a stiffening element 153 which extends in an axial direction 3 and is provided for the purpose of stiffening the stator 7. The stiffening element 153 is connected to the fastening device 15, in particular to the plates, at the first and second axial end 701 and 702 of the stator 7. In the case of the first exemplary embodiment of the electrical machine 1, the stiffening element is a tension rod which advantageously interacts with the fastening device 15 to stiffen the stator. It is therefore possible in an advantageously economical manner to achieve a uniform air gap 6 along its length in an axial direction 3. The stiffening element 153 extends in an axial recess which is formed by the laminations 710 of the laminated core. The stiffening element 153 therefore runs within the curve of the stator 7, in particular a lateral area of a lamination 710 as viewed in an axial direction 3. Therefore a coolant which flows over the stator 7 in a flow direction 19 corresponding to or opposite to the axial direction 3 is influenced only slightly. The same applies to a coolant flowing in a tangential direction which extends perpendicularly relative to the axial direction 3 and perpendicularly relative to one of the radial directions. The fastening device 15 can have further stiffening elements 153 which likewise run in an axial direction 3 for the purpose of stiffening the stator 7 but are not shown in FIG. 1. These can be uniformly distributed over a surface of the stator 7.

In an exemplary embodiment of a method for producing an electrical machine according to the invention, e.g. the first exemplary embodiment of the electrical machine 1, a method step provides for the rotor 4 to be positioned in a hole of the stator 7, a further method step provides for the stator 7 with the rotor 4 to be transported to the frame 12, the rotor 4 being supported by the stator 7. In a method step following thereupon, the stator 7 with the rotor 4 is placed in the frame 12. In a further method step following thereupon, the stator 7 is fastened to the frame 12 by means of the fastening units 151 and the first and the second bearing device 16,17 fastened to the frame by means of the securing elements 161. In a further method step following thereupon, the air gap 6 that exists in the hole in radial directions between the rotor 4 and stator 7 is adjusted by means of the adjustment device 152.

The stator 7 has a flow arrangement 20 for cooling the electrical machine 1. The flow arrangement 20 has recesses at the laminations 710, wherein said recesses run in an axial direction 3 and form channels 1531 for cooling the electrical machine 1 by means of the coolant which flows in the flow direction 19. For the purpose of cooling the electrical machine 1, the sleeve 11 has a first axially oriented opening 470, this being provided on that side of the electrical machine 1 which has the second radial frame part 124 and being provided for the purpose of cooling the electrical machine 1, wherein the axially oriented opening 470 is connected to an axial flow space 10. A fan 52 is arranged at the first axially oriented opening 470 on that side of the electrical machine 1 having the second radial frame part 124, wherein said fan 52 can convey the coolant through all of the axially oriented opening 470, from outside the electrical machine 1 into the electrical machine 1 in the flow direction 19 via an axially oriented opening of a fan housing 53 for the fan 52. The axially oriented opening of the fan housing 53 is situated on a side of the fan 52 facing away from the radial frame part 124. The coolant in the interior chamber 10 flows over stator winding heads 704, over the flow arrangement 20 and stator winding heads 703, and can leave the electrical machine 1 through second axially oriented openings 1111 of the first device 111 of the sleeve 11 and through second axially oriented openings 1121 of a second device 112 of the sleeve 11. The stator winding heads 703, 704 are arranged at the first axial end 701 and the second axial end 702 of the stator 7 and are integral parts of a winding, preferably a plurality of windings, secured to the stator. The dividing device 2 has a second dividing device 18 comprising detachable contact points for lifting the frame 12 from a second device 112. The second dividing device 18 has a first dividing unit 181 and further first dividing units 182. The first dividing unit 181 and the further first dividing units 182 comprise holes 1811, 1812 (see FIG. 14) on a face of the frame 12 and detachable connections which run from the second device 112 through the first axial frame part 123 and the second axial frame part 121 respectively. The detachable connections are embodied in the form of a nut and bolt connection, wherein the bolt or a threaded bar runs through the hole 1811 (see FIG. 14) on the face of the frame 12 at one or both ends. Each detachable connection provides detachable contact points between thread and nut, wherein the detachable contact points are no longer in contact after the nuts have been loosened and removed from the thread. In FIG. 1, the nuts are visible at the dividing face 212 of the second axial frame part 121. The detachable contact points are situated in the first dividing unit 181 and the further first dividing units 182 of the second dividing device 18, wherein the frame 12 comprises the holes 1811, 1812 as part of the first dividing unit 181 and the further first dividing units 182. The first bearing device 16 is secured to the first radial frame part 122 by means of securing elements 161. In this case, two of the securing elements 161 and the shaft of the rotor 4 lie on a line which runs through regions where the first radial frame part 122 connects to the first axial frame part 123 and the first radial frame part 122 connects to the second axial frame part 121. An electrical machine is thus provided in an advantageously economical and high-quality manner, since the interior chamber 10 can advantageously be made accessible outside of the radial plane 13 and outside of parallel planes 131 by virtue of the dividing device 2. The second device 112 of the sleeve 11 is a transportable device of metal construction and has securing devices 1122 for the electrical machine 1, in order to secure it at an installation site. The transportable device can also advantageously consist primarily of a metal cast part. Features which are cited in the text in relation to exemplary embodiments but are not denoted by reference signs in FIG. 2 to FIG. 17 illustrating said exemplary embodiments are embodied in an advantageously economical manner as per the exemplary embodiment in FIG. 1.

FIG. 3 shows a section perpendicular to the axial direction 3 through the second device 112 of the sleeve 11 of the first exemplary embodiment of the electrical machine 1. The second device 112 has a dividing face 1820 in which a hole 1810 of the first dividing unit 181 is provided for a bolt. The second device 112 of the sleeve 11 supports the frame as a body comprising the frame 12, stator 7 and rotor 4, the weight acting on said body, at least at a dividing face 1820 of the second device 112 of the sleeve 11, wherein a portion of the weight acts on the dividing face 1820 perpendicularly relative to the at least one dividing face 1820.

Figure 2:
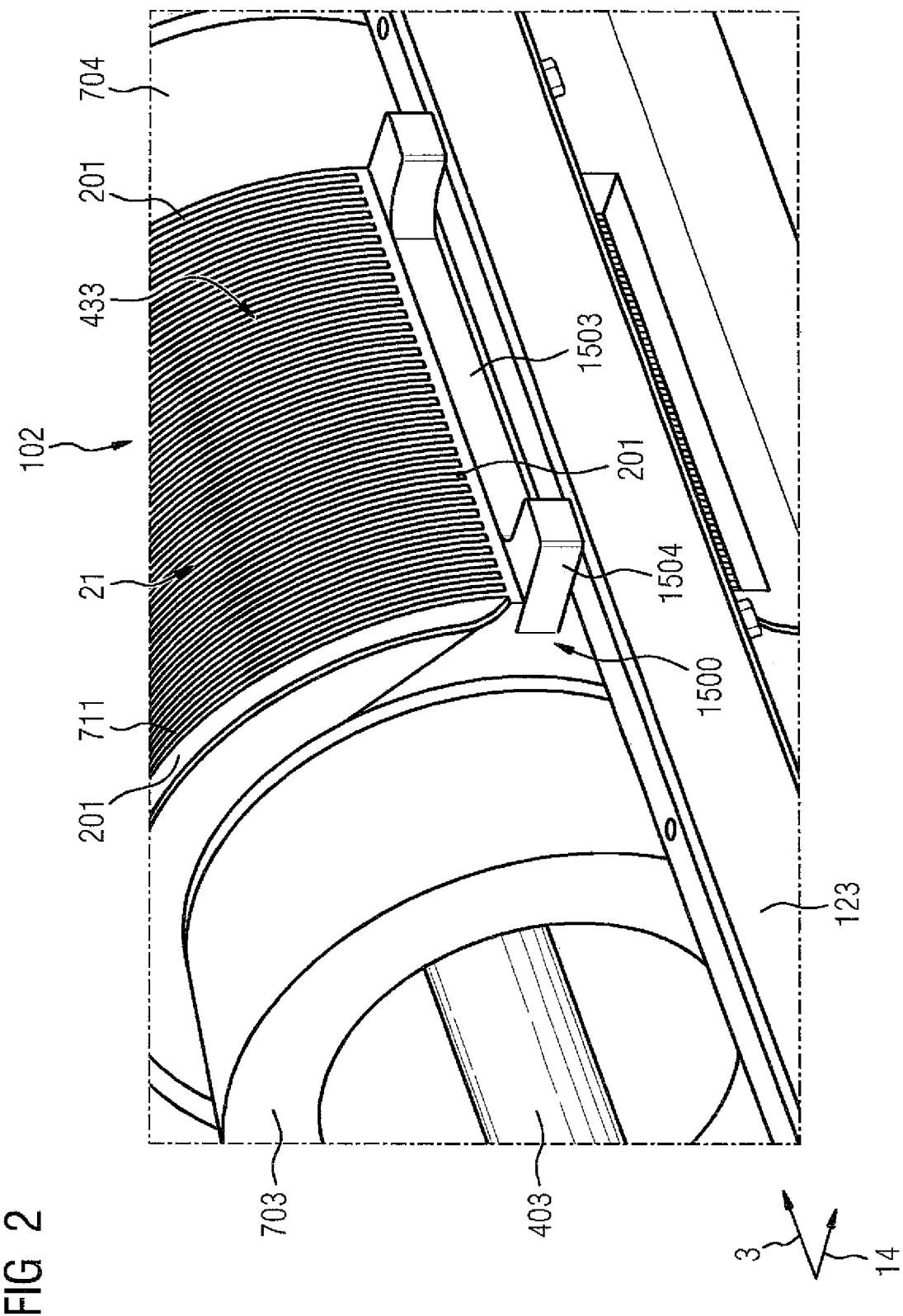
FIG. 2 shows a detail of a second exemplary embodiment of an electrical machine.

FIG. 2 shows a detail of a second exemplary embodiment of an electrical machine 102, wherein the stator of the electrical machine 102 has a stiffening element 1503 comprising a fastening unit 1504 of a fastening device 1500. The stiffening element 1503 can guide a coolant out of the stator in a radial direction 14 which is perpendicular to the axial direction 3. The stator has different laminations 711 to those of the stator 7 of the first exemplary embodiment of the electrical machine 1, wherein the stator of the electrical machine 102 of the second exemplary embodiment has a laminated core which comprises laminations 711 that are stacked in the axial direction 3 from the first to the second axial end of the stator, wherein recesses 201 of a flow arrangement 21 of the stator have linear extensions which run in tangential directions in a plane perpendicular to the axial direction 3. A tangential direction is perpendicular to the axial direction 3 and to one of the radial directions, wherein the first radial direction 14 is one of the radial directions. The stator in FIG. 2 has a tangential surface, wherein that part of the tangential surface 433 of the stator which is found between the stator winding heads 703, 704 is mainly formed by the laminations 711 of the laminated core. The electrical machine 102 comprises a rotor which has a shaft 403.

FIG. 4 shows a view of a top side of a third exemplary embodiment of an electrical machine 103, looking through a first device of a sleeve of the electrical machine 103. The electrical machine 103 comprises a stator 740 which has a flow arrangement 22 (see FIG. 5) for cooling the electrical machine 103 via recesses 201, wherein linear extensions of the recesses 201 run in tangential directions in a plane perpendicular to the axial direction 3. In this case, the recesses 201 are formed by laminations stacked in an axial direction 3. The laminations 711 of the second exemplary embodiment of the electrical machine 102 as per FIG. 2 can be used for this purpose. A coolant, in particular air, is conveyed from surroundings of the electrical machine 103 via a heat dissipation device 51 into an interior chamber of the electrical machine 103 as an axial coolant flow, and flows along a flow direction 191 above and below the second radial frame part 124 into a first and second part of the interior chamber of the electrical machine 103, in an axial flow space extending from a first axially oriented opening 47 (see FIG. 5) for cooling the electrical machine 103 to a baffle device 43. The baffle device 43 is a first axial boundary of the axial flow space. The baffle device 43 is arranged at the first axial end 741 of the stator 740 in this case. The tangential surface 433 between the stator winding heads 703, 704 is a perimetrical face of the stator 740. The baffle device 43 is a plate having openings 431 forming a passage to the axial flow space for cooling stator winding heads 703,704. The stator winding heads 703,704 which have to be cooled are situated within a first protective tube 44. The baffle device 43 delimits a first portion of the interior chamber from a remaining interior chamber, wherein that part the tangential surface 433 of the stator 740 which is found between the stator winding heads 703, 704 is situated in the remaining interior chamber, and a sleeve 1311 (see FIG. 13) of the electrical machine 103 has an opening 1112 for cooling the first part of the interior chamber, wherein the stator winding heads which are situated within the protective tube 44 extend in the first portion of the interior chamber. A sufficient quantity of coolant therefore flows in the flow direction 192 via the protective tube 44 and leaves the electrical machine 103 through the sleeve 1311, taking a different path to the coolant flowing along that part of the tangential surface 433 of the stator 740 which is found between the stator winding heads 703,704 and leaving the electrical machine 103 through a first opening 1110 of the sleeve 1311 (flow directions 191,193). The electrical machine 103 has a guide device 42 which is arranged between the axial flow space 41 and a first space 50 (see FIG. 5) in the interior chamber of the electrical machine 103. The guide device 42 is secured to the stator 740 of the electrical machine 103 by means of detachable connection elements. For this purpose, the stator 740 can have threaded holes which allow a detachable connection using bolts. The guide device 42 has a passage arrangement 421 for the coolant in the axial direction 3 along that part of the tangential surface 433 of the stator 740 which is found between the stator winding heads 703,704. Therefore a colder coolant can flow more uniformly from the axial flow space 41 along the stator 740 in the axial direction 3 into the first space 50 at the tangential surface of the stator 740, as marked by the flow directions 191,193 in FIG. 4.

In the case of the electrical machine 103 according to FIG. 4, on that side of the electrical machine 103 having the first axial frame part 123, a second device 1123 (see FIG. 5) of the sleeve 1311 has a further first opening 1120 for cooling the electrical machine 103, wherein the first axial frame part 123 is situated between the first opening 1110 and a further first opening 1120. This can also be seen in FIG. 7, which shows a fifth exemplary embodiment of an electrical machine 105 having a first device 72 and the second device 1123, these being identical to the first and second device 72,1123 in FIG. 5. A side of the electrical machine 103 having the second axial frame part 121 has a further second opening corresponding to the further first opening.

The axial coolant flow in flow direction 191 is transformed by means of the guide device 42 into two partial flows having a large width that corresponds to the length of that part of the tangential surface 433 of the stator which is found between the stator winding heads 703,704 in an axial direction 3, and the partial flows are directed in a short flow path in the flow direction 193 over a first part of the tangential surface of the stator for the cooling thereof, said first part of the tangential surface being situated in a first part of the interior chamber, and guided out of the electrical machine 103 through the first opening 1110 and the second opening 1109. The same applies for the second part of the tangential surface of the stator, this being situated in a second part of the interior chamber, i.e. in the second device 1123. The second part of the tangential surface is cooled by means of a second tangential coolant flow accordingly, the latter comprising two partial flows which are guided out of the electrical machine 103 through the further first opening 1120 and the further second opening.

FIG. 5 shows a section through the third exemplary embodiment of the electrical machine 103, said machine 103 comprising a rotor 54. The rotor 54 has a shaft 405 for rotatably mounting the rotor 54 in the first and second bearing device 16,17, wherein the shaft 405 has a hole 4051 in an axial direction 3 for transporting waste heat of the electrical machine 103 to the heat dissipation device 51, said heat dissipation device 51 being situated outside the frame 12 in the axial direction 3. The first and the second bearing devices 16,17 comprise rolling bearings or plain bearings. The first and the second protective tube 44,46 has, at its axial end which faces the first radial frame part 122 or the second radial frame part 124 respectively, an axial boundary 443, 463 which extends in radial directions to the shaft 405. The axial boundary 443,463 has a seal around the shaft 405, which advantageously excludes almost completely the penetration into the air gap 6 of dirt particles in an axial direction 3. The rotor 54 has a laminated core comprising laminations which are stacked in an axial direction 3. The rotor 54 has an entity which allows it to interact magnetically via the air gap 6 with the stator 7, in particular with the winding that is secured to the stator 7. In the third exemplary embodiment of the electrical machine 103, the rotor has rods which run through the laminated core in an axial direction 3 and which are short-circuited at the two axial ends by means of a ring. The rotor 54 is therefore a squirrel-cage rotor. During operation of the electrical machine 103, the rotor and in particular the squirrel-cage winding heats up. The laminated core of the rotor 54 is secured to a the region of a shaft 405 in which the hole 4051 extends. The hole 4051 otherwise extends in the axial direction 3 into a region outside of the frame 12. Therefore a coolant which is present in the hole 4051 can transport the waste heat of the rotor 54 to the heat dissipation device 51. In the third exemplary embodiment of the electrical machine 103, the hole 4051 has a thermosiphon which transports the heat from that region of the shaft 405 comprising the laminated core to an end of the shaft 405 comprising the heat dissipation device 51. At that end of the shaft 405 comprising the heat dissipation device 51, the heat is transported away by the heat dissipation device 51 via the axial coolant flow.

Figure 6:
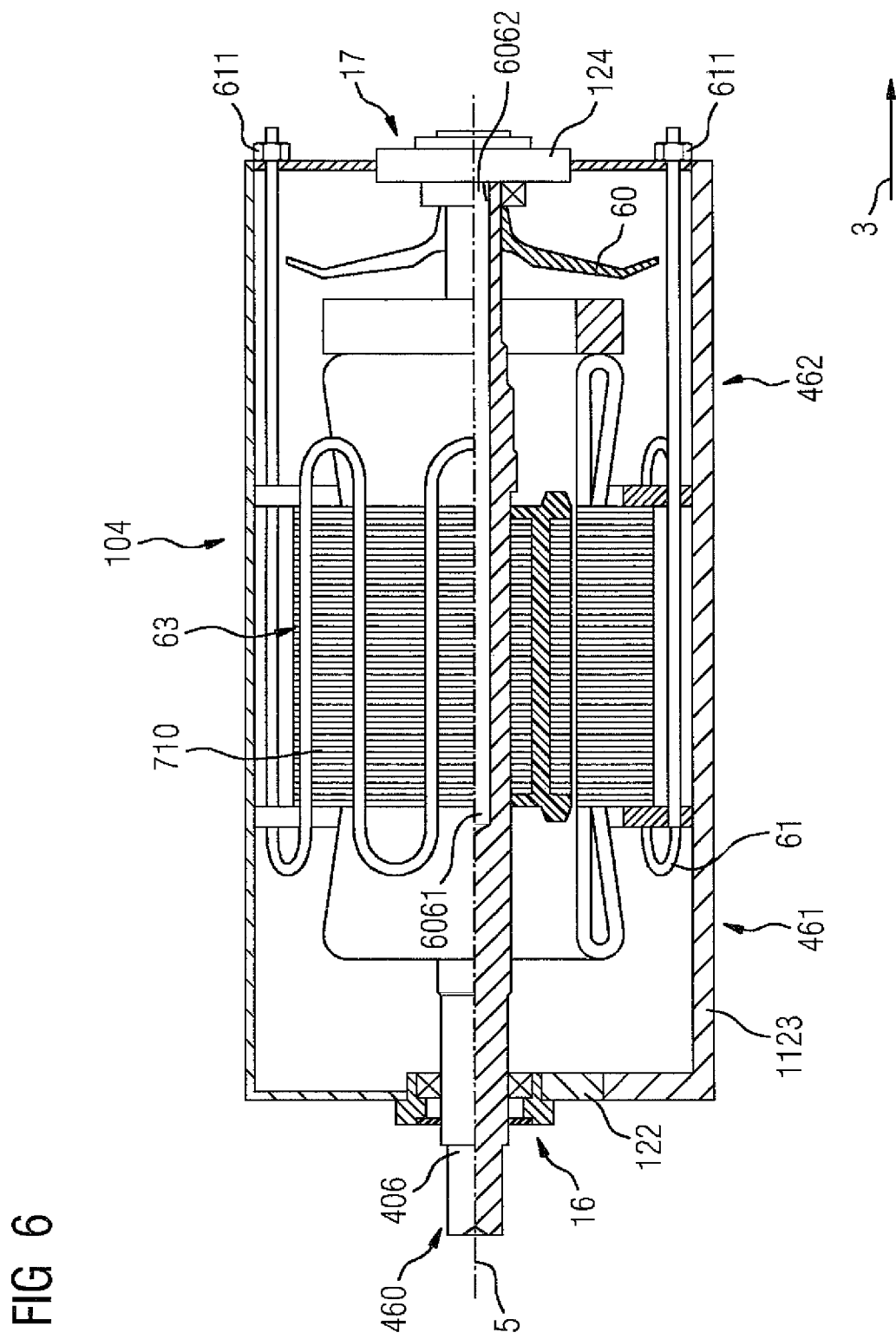
FIG. 6 shows two sections, divided by a rotational axis, through a fourth exemplary embodiment of an electrical machine.

FIG. 6 shows two sections, these being separated by a rotational axis 5 through a fourth exemplary embodiment of an electrical machine 104, wherein a stator of the electrical machine 104 has pipe sections for cooling the stator. The stator has the laminations 710 stacked in an axial direction. The laminations 710 have recesses which run in an axial direction 3 and in which pipe sections 61 are guided from a first axial end of the stator to a second axial end of the stator. The pipe sections 61 are connected to form a pipe system, which is secured to a tangential surface 63 of the stator, being guided back and forth by the recesses. The ends of the pipe system are guided out of a sleeve at an axial end of the electrical machine 104, wherein connection interfaces 611 of the pipe system are provided on the sleeve for the purpose of supplying and removing a liquid coolant. The electrical machine 104 comprises a rotor 460, which has a shaft 406 for rotatably mounting the rotor 460 in the first and second bearing device 16,17, wherein the shaft 406 has a hole 4061 in the axial direction 3 for transporting waste heat of the electrical machine 104 to a heat dissipation device 60, wherein the heat dissipation device 60 is situated within the frame 12 at the first or second axial end 461,462 of the rotor 460 in the axial direction 3. For this purpose, the electrical machine 104 according to FIG. 6 has a thermosiphon 4062 in the hole 4061. The heat dissipation device 60 can advantageously suck in a gaseous coolant which has been cooled as a result of flowing past or around the pipe system in a region between the second axial end 462 of the rotor 460 and the second radial frame part 124 in an axial direction 3, and can guide the warmed gaseous coolant to the region of the pipe system for cooling by the liquid coolant. For this purpose, the heat dissipation device 60 is connected to the shaft 406 in a non-rotatable manner. The pipe system of the fourth exemplary embodiment carries a liquid coolant in the region of the heat dissipation device 60, and during operation of the electrical machine 104 said liquid coolant usually has a lower temperature than the gaseous coolant which is to be cooled as a result of flowing past or around the pipe system. If this is not the case, the connection interfaces 611 for supplying cooled coolant into the electrical machine 104 are used and the warmed coolant is drawn off at further connection interfaces of the pipe system, these being situated closer to the first bearing device than the heat dissipation device 60 in the axial direction 3.

Figure 7:
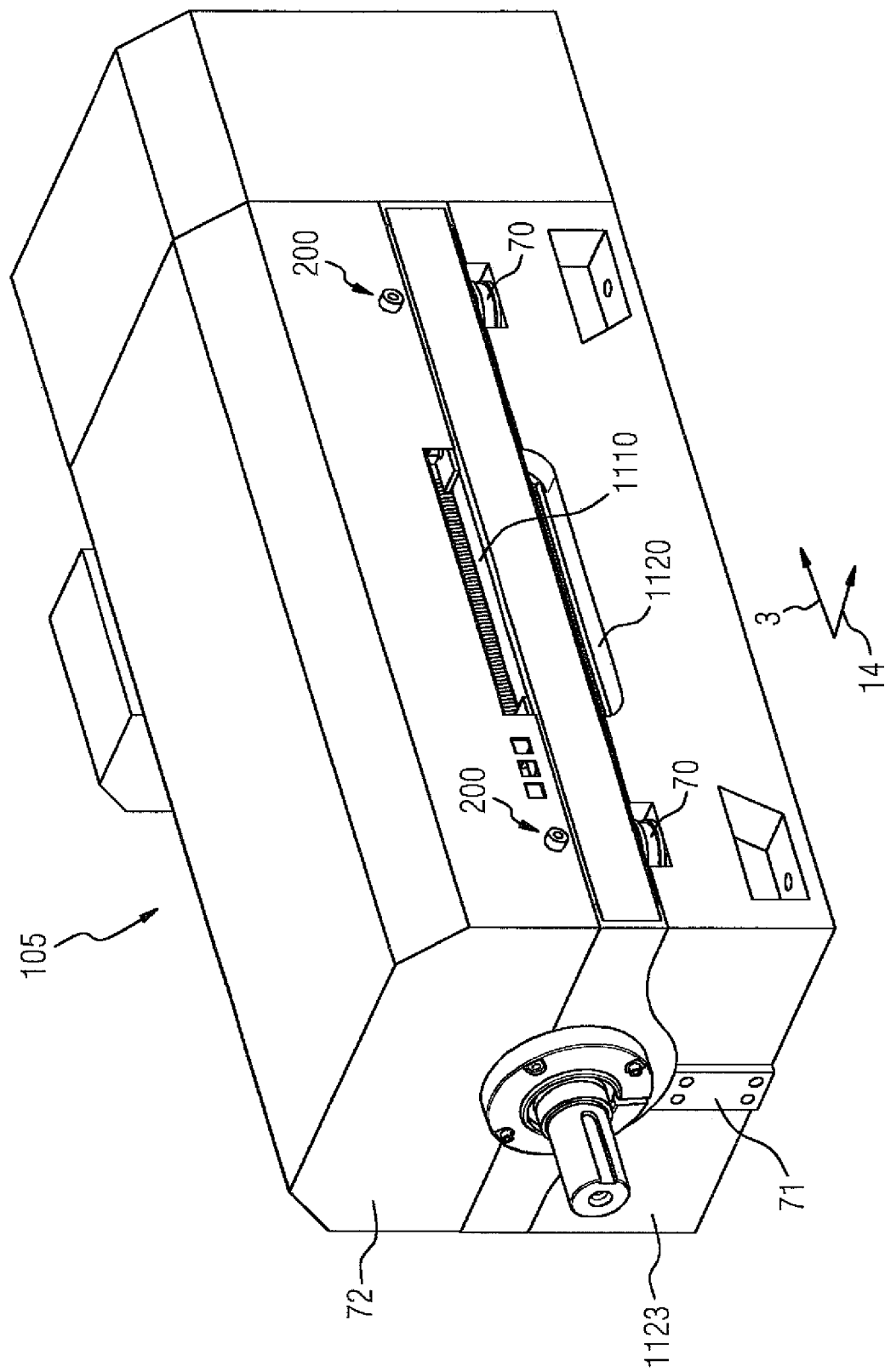
FIG. 7 shows a fifth exemplary embodiment of an electrical machine.

FIG. 7 shows a fifth exemplary embodiment of an electrical machine 105. The electrical machine 105 has an isolating unit 70 between the sleeve, this comprising the first device 72 and the second device 1123, and the frame 12. The electrical machine 105 has the isolating units 70 between the first axial frame part 123 and the second device 1123 of the sleeve. On that side having the second axial frame part 121, the electrical machine 105 correspondingly has isolating units 70 between the second axial frame part 121 and the second device 1123 of the sleeve. The electrical machine 105 has a cover 71 on the second device 1123, concealing a passage in the second device 1123, wherein no isolating unit 80 for adjusting the rigidity of the mounting in a region of the first bearing device is provided in the passage in the case of the electrical machine 105. The electrical machine 105 has a dividing device comprising a first dividing device between the first device 72 and the frame 12 for lifting the first device 72 from the frame 12. Bolt heads of bolts 200 are visible in FIG. 7. The first dividing device of the electrical machine 105 has dividing units in the form of nut and bolt connections which include the bolts 200 and angles 141 on the frame 12 (see FIG. 14). The angles 141 may comprise threaded holes for this purpose. The frame 12 comprises the angles 141 as part of the dividing unit of the first dividing device.

Figure 8:
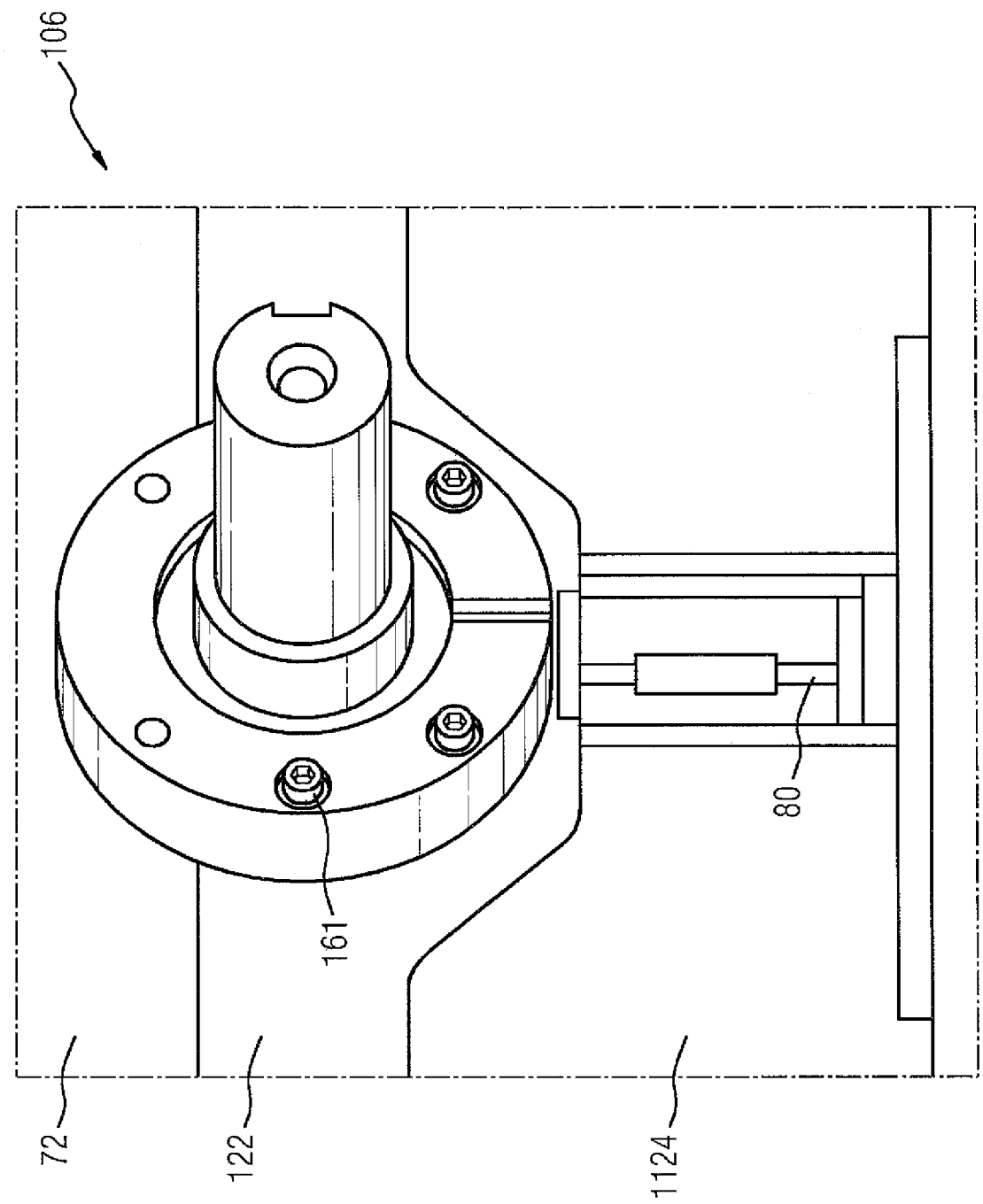
FIG. 8 shows a detail of a sixth exemplary embodiment of an electrical machine.

FIG. 8 shows a detail of a sixth exemplary embodiment of an electrical machine 106. Between the first radial frame part 122 and a second device 1124 of a sleeve 11 of the electrical machine 106, the electrical machine 106 has an isolating unit 80 for adjusting the rigidity of the mounting in a region of the first bearing device 16. The second device 1124 comprises concrete in this exemplary embodiment.

Figure 9:
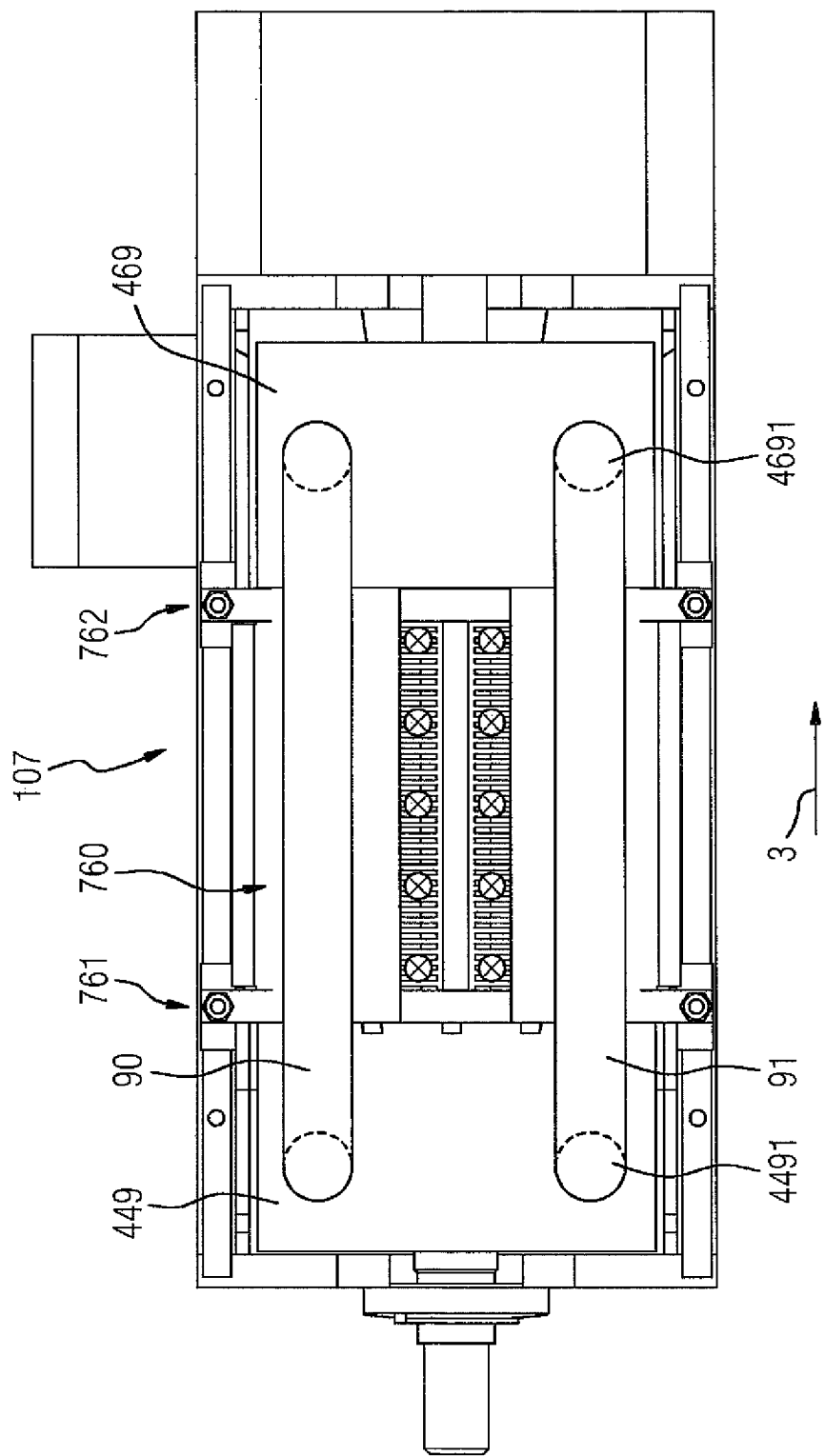
FIG. 9 shows a view of a top side of a seventh exemplary embodiment of an electrical machine, looking through a first device of a sleeve.

FIG. 9 shows a view of a top side of the seventh exemplary embodiment of an electrical machine 107, looking through a first device of a sleeve. The electrical machine 107 comprises a stator 760 having a first protective tube 449 and a second protective tube 469, wherein the first protective tube 449 is secured between the first radial frame part 122 and the first axial end 761 of the stator 760, and the second protective tube 469 is secured between the second axial end 762 of the stator 760 and the second radial frame part 124. An opening 4491 of the first protective tube 449 is connected via an overflow channel 91 to an opening 4691 of the second protective tube 469. In addition to the overflow channel 91, the electrical machine 107 has a further overflow channel 90 which is likewise connected to openings of the first and second protective tube 449,469. A shaft-mounted fan is secured to a shaft of a rotor of the electrical machine 107 as a conveyor device for a coolant flow through the first and second protective tube 469,449 and the overflow channels 90,91. The overflow channels 90,91 run in a part of the interior chamber of the electrical machine 107, said part of the interior chamber being produced in an advantageously economical manner by an angular cross-sectional shape of a first device of a sleeve of the electrical machine 107 and a round cross-sectional shape of the stator 760, these cross-sectional shapes being evident when viewed in an axial direction 3. As a result of the proximity of the overflow channel 90 to the first axial frame part 121, and the overflow channel 91 to the second axial frame part 123, the overflow channels 90,91 can be made advantageously accessible by means of the dividing device on the frame 12. In the case of the electrical machine 107, a visual inspection of or access to parts within the first and second protective tube 449,469 via the openings 4491,4691 of the first and second protective tube 449,469 is advantageously possible by means removing or omitting to install the overflow channels 90,91.

Figure 10:
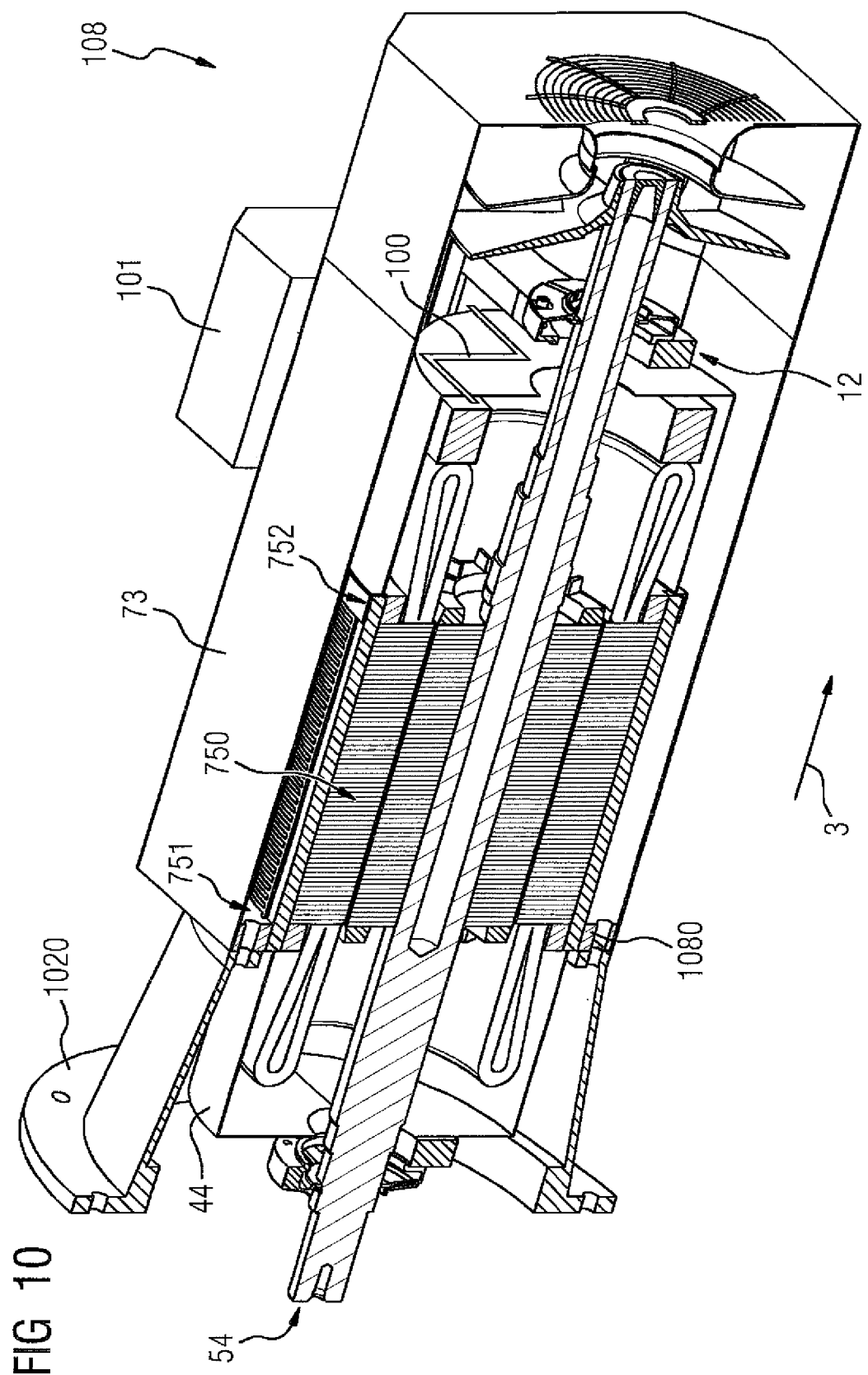
FIG. 10 shows a three-dimensional section of an eighth exemplary embodiment of an electrical machine.

FIG. 10 shows a three-dimensional section of an eighth exemplary embodiment of an electrical machine 108. The electrical machine 108 has a securing device 160 (shown in FIG. 16) for securing the frame 12 to a flange for operation of the electrical machine 108, wherein the rotational axis 5 runs in a vertical direction. For this purpose, the securing device 160 has bolts 1600 as part of the securing device 160. The electrical machine 108 has a flange device 1020, which is secured to the stator 750 and the frame 12. The flange device 1020 supports the stator 750 at a pressure plate 1080 at a first axial end 751 of the stator 750. The flange device 1020 and the pressure plate 1080 have openings which can be used as passages to a first protective tube 44 for the purpose of cooling stator winding heads. The axial flow space is situated in a remaining interior chamber which contains the stator 750. The flange device 1020 surrounds a first portion of the interior chamber in radial directions, wherein said first portion of the interior chamber contains the protective tube with the stator winding heads at the first axial end 751 of the stator. The pressure plate 1080 and the flange device 1020 thus form a baffle device which delimits the first portion of the interior chamber relative to the remaining interior chamber. The flange device 1020 can have an opening for cooling the first part of the interior chamber. Therefore the stator winding heads at the first axial end 751 can advantageously be cooled by a coolant flow having a different path to the coolant which flows along a tangential surface of the stator 750 and leaves or flows into the electrical machine 108 via a sleeve. In the case of the electrical machine 108, the sleeve has a first device 73 and a second device, this being structurally identical to the first device 73 in an advantageously economical manner. The interior chamber can advantageously be made accessible by removing the first and the second device 73. A terminal box 101 is secured to the frame 12 for the purpose of laying a lead 100 from the stator 750 via the frame to the terminal box 101. The lead 100 is electrically connected to the windings at the stator winding heads, said windings being secured to the stator 750, in order to supply electrical energy via the windings when operating the electrical machine 108 as a motor, or to draw electrical energy off when operating as a generator for an electrical load which is connected to the electrical machine 108 at the terminal box 101. The lead 100 comprises a plurality of conductors in order to transport the electrical energy using a three-phase system, for example. The lead 100 is routed from the stator winding head at the second axial end 752 of the stator 750, via an axial boundary of a protective tube that is secured to the second axial end 752 of the stator 750, to the second axial frame part 121 of the electrical machine 108. The lead is guided from the second axial frame part 121 into the terminal box 101. It is advantageously also possible to install the lead on that side of the axial boundary which faces the stator winding head at the second axial end 752, or directly from the stator winding head on a short path to the second axial frame part 121. The latter is possible in the case of an electrical machine which does not have a protective tube at the second axial end 752 of the stator 750. It is also advantageously possible to ensure that neither servicing nor production of an electrical machine according to the invention is greatly hampered by a plurality of leads if, instead of the lead 100, a plurality of leads having one or more conductors are installed in the same manner as the lead 100 described above.

Figure 11:
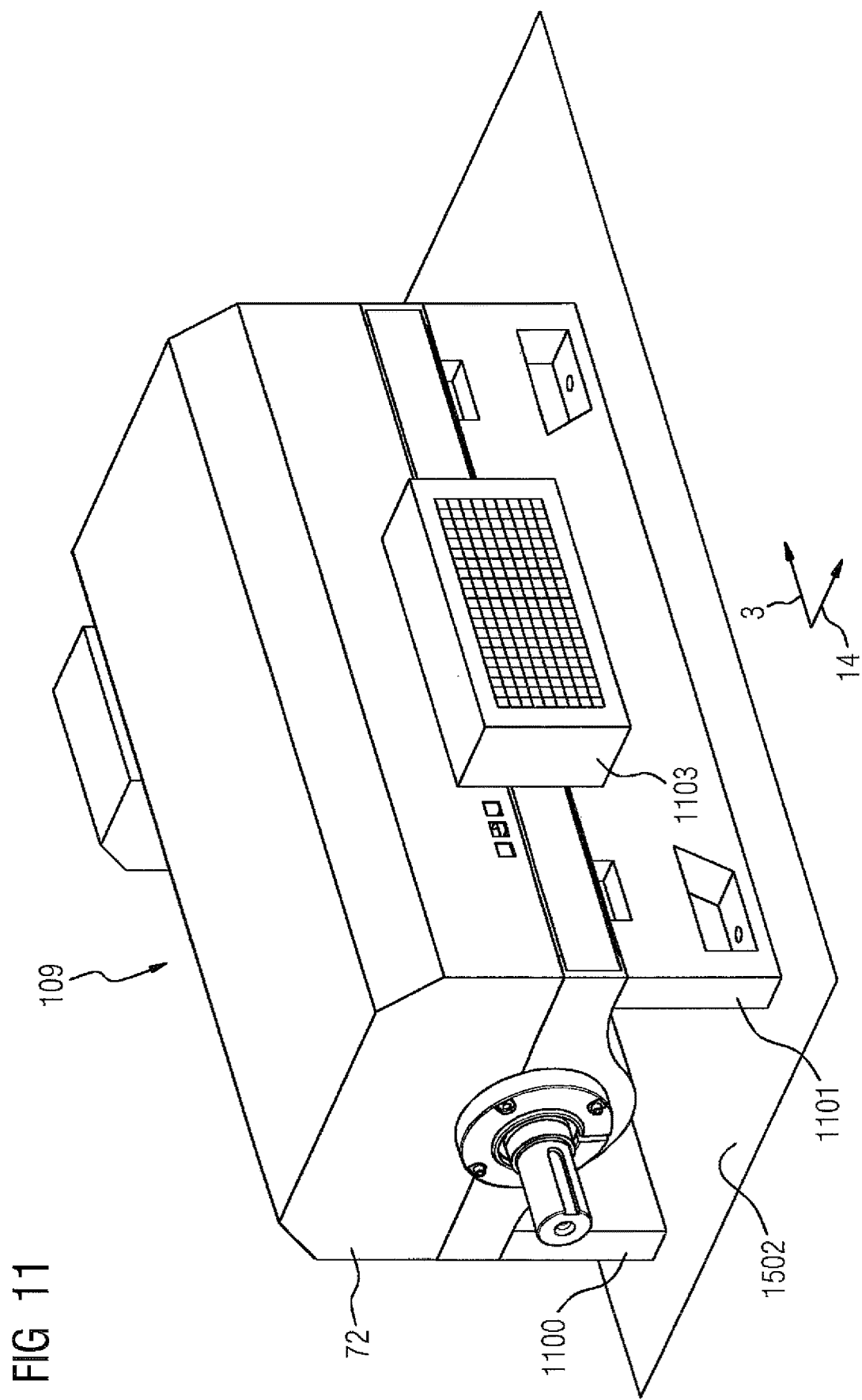
FIG. 11 shows a ninth exemplary embodiment of an electrical machine.

FIG. 11 shows a ninth exemplary embodiment of an electrical machine 109, wherein second device is a base 1100,1101 which is present at an installation site 1502 of the electrical machine 109. The sleeve of the electrical machine 109 therefore comprises the second device in addition to the first device 72 at the installation site 1502. The base 1100, 1101 has two parts. The first part of the base 1100 extends along the second axial frame part 121 and into the subsurface at the installation site 1502. The second part of the base 1101 extends along the first axial frame part 121 and further into the subsurface beneath the installation site 1502. Therefore the base 1100,1101 can carry the electrical machine 109 and provide adequate support during operation. The electrical machine 109 has a fan 1103 for conveying a coolant flow through the first opening 1110 of the first device 72 of the sleeve and through a further first opening of the base 1101. The second axial frame part is situated between the first opening and the further first opening. A coolant flow can therefore be divided into a first tangential coolant flow, which flows through the first opening and into a first space of the electrical machine 109, and a second coolant flow which can flow through the second opening and into the first space. The fan 1103 is secured to the first axial frame part. Therefore the interior chamber outside of the radial plane and outside of the parallel planes can advantageously be made accessible by the dividing device. It is not necessary to remove the fan from the electrical machine 109 in order to remove the first device of the sleeve and lift the frame from the second device of the sleeve. A tangential surface of a stator of the electrical machine 109 has a first part which is present in a first part of an interior chamber, and a second part which is present in a second part of the interior chamber. The first tangential coolant flow is therefore conveyed by the fan 1103 through the opening 1110 (see FIG. 7) into the first space containing the first part of the tangential surface of the stator, where it can absorb waste heat of the stator, and leaves the interior chamber of the electrical machine 109 via the second opening 1109. The second tangential coolant flow is conveyed by the fan 1103 through the further first opening in the base 1101 and into a second space in the second part of the interior chamber, where it absorbs waste heat of the second part of the tangential surface of the stator before leaving the electrical machine 109 through a further second opening which is situated in the base 1100. Therefore the stator of the electrical machine 109 can advantageously be cooled by the first tangential coolant flow over the first part of the tangential surface and by the second tangential coolant flow over the second part of the tangential surface.

Figure 12:
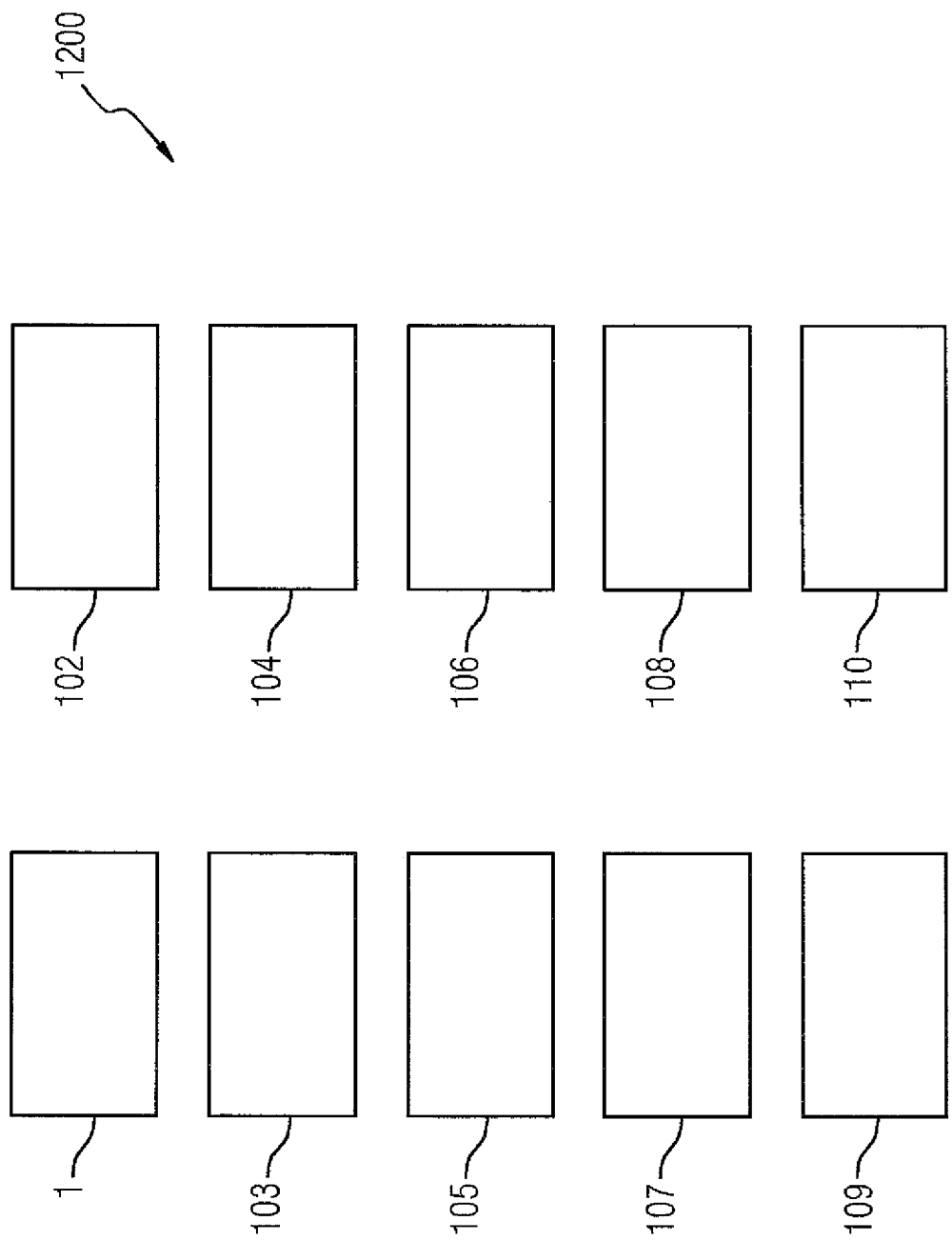
FIG. 12 shows an exemplary embodiment of a series of electrical machines.

FIG. 12 shows an exemplary embodiment of a series 1200 of electrical machines. Said series 1200 comprises the electrical machine 1 according to the first exemplary embodiment as per FIG. 1, the electrical machine 102 according to the second exemplary embodiment as per FIG. 2, the electrical machine 103 according to the third exemplary embodiment as per FIG. 4 and FIG. 5, the electrical machine 104 according to the fourth exemplary embodiment as per FIG. 6, the electrical machine 105 according to the fifth exemplary embodiment as per FIG. 7, the electrical machine 106 according to the sixth exemplary embodiment as per FIG. 8, the electrical machine 107 according to the seventh exemplary embodiment as per FIG. 9, the electrical machine 108 according to the eighth exemplary embodiment as per FIG. 10, the electrical machine 109 according to the ninth exemplary embodiment as per FIG. 11, and an electrical machine 110 according to a tenth exemplary embodiment as per FIG. 17.

A further exemplary embodiment of a series of electrical machines comprises a first electrical machine comprising a stator 7 whose flow arrangement 20 has recesses 710 at the laminations, wherein said recesses run in an axial direction 3 and form channels 1531 for cooling the first electrical machine. The series further comprises a second electrical machine comprising a stator 740 whose flow arrangement 22 has recesses 201, wherein linear extensions of the recesses 201 run in a plane perpendicular to the axial direction 3. In this case, the recesses 201 are formed by laminations 711 which are stacked in an axial direction 3. When producing or servicing the series, the stators can advantageously be added, removed or exchanged for both electrical machines, since the interior chamber can advantageously be made accessible outside of the radial plane and outside of the parallel planes by means of the dividing device. The respectively assembled unit for the first and second electrical machine, comprising frame with stator and rotor, can be connected to the sleeve of the first and second electrical machine respectively in an advantageously economical manner by means of identical method steps. The same applies to the separation of the assembled unit from the sleeve.

Figure 13:
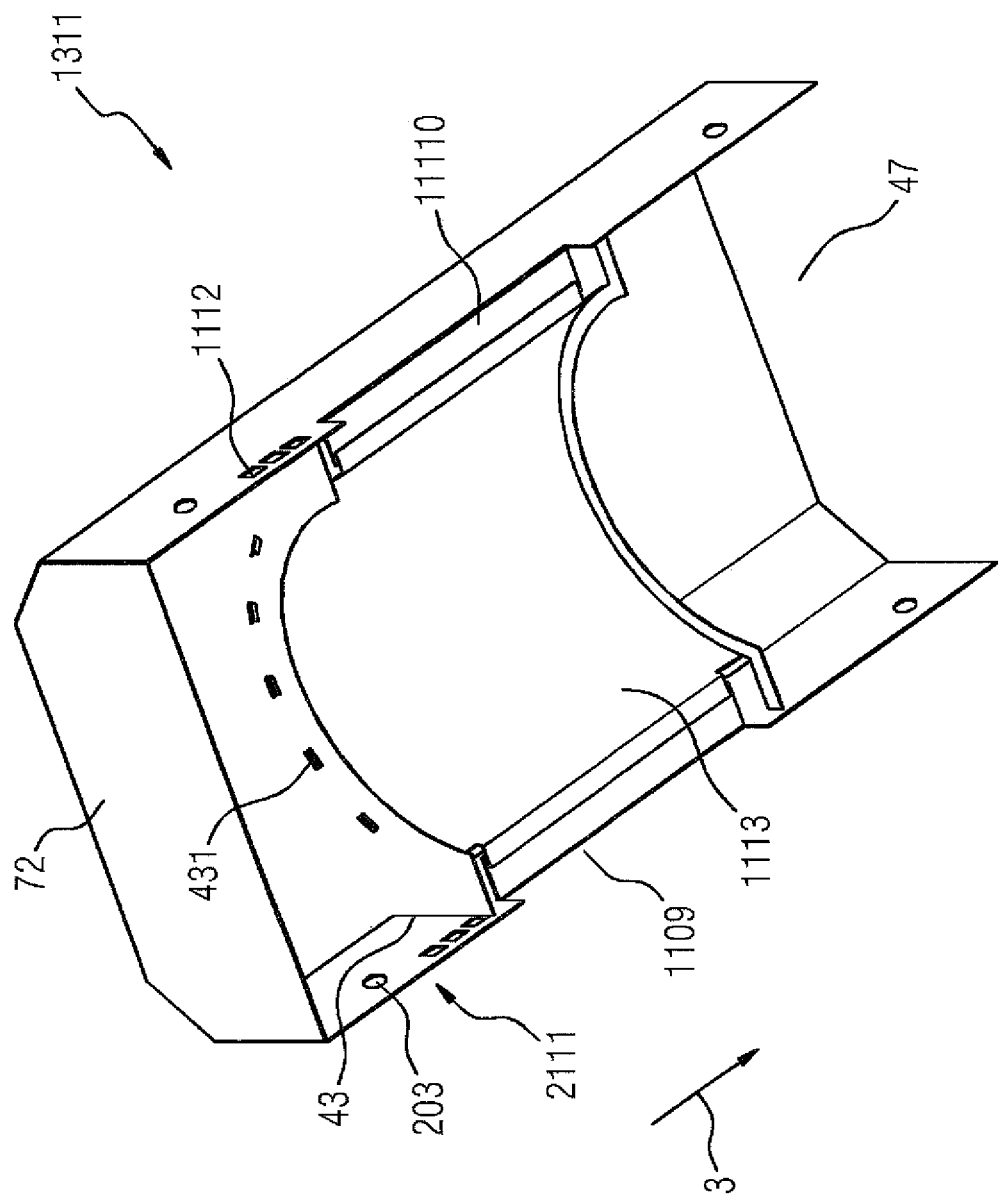
FIG. 13 shows an exemplary embodiment of a first device of a sleeve for an electrical machine.

FIG. 13 shows an exemplary embodiment of a sleeve 1311 for an electrical machine. The sleeve 1311 comprises the first device 72. The device 72 has a dividing edge 2111 which, together with a dividing face 212,2112 of a frame 12, can form the first dividing device of an electrical machine according to the invention. The first device 72 also has holes 203 which, as an alternative to the dividing edge 2111 or in combination with the dividing edge 2111, can form part of a first dividing device of an electrical machine according to the invention. The first device 72 has two opposing side walls, one of which has the first opening 1110 that interrupts the dividing edge 2111. The opposite side wall has the second opening 1109, this being congruent with the first opening 1110. The outer guide device 1113 is secured to the first device 72. The outer guide device 1113 attaches to the first opening 1110 and the opposing second opening 1109. Between a first axial end of the device 72 and the first opening 1110 or the second opening 1109 respectively, each of the side walls of the first device 72 has openings 1112 for cooling the first part of the interior chamber, in particular the stator winding heads. The two side walls are connected by a transverse wall at the first axial end of the first device 72. An opening 47 is situated at a second axial end of the first device 72. At a first axial end of the outer guide device, the first device 72 has the baffle device 43 which is secured to the first device 72. The baffle device 43 has openings 431 which form a passage between a first portion of an interior chamber of the first device 72, this being situated between the first axial end of the first device 72 and the first axial end of the outer guide device 1113, and a remaining part of the interior chamber of the first device 72. The first portion of the interior chamber is delimited by that part of the side walls which has the openings 1112. Since the first device has to support only a small fraction of the weight of an electrical machine according to the invention, and absorb only a small fraction of the forces that occur during operation of an electrical machine according to the invention, the first device 72 can be fabricated mainly from metal sheets. Faces of the interior chamber of the first device 72 and/or the dividing edge 2111 can be coated in an advantageously economical manner with materials which advantageously attenuate the airborne sound or isolate the first device 72 from a solid-borne sound in order to ensure a high quality of an electrical machine according to the invention. The stator of an electrical machine according to the invention may be one source of the solid-borne sound.

Figure 14:
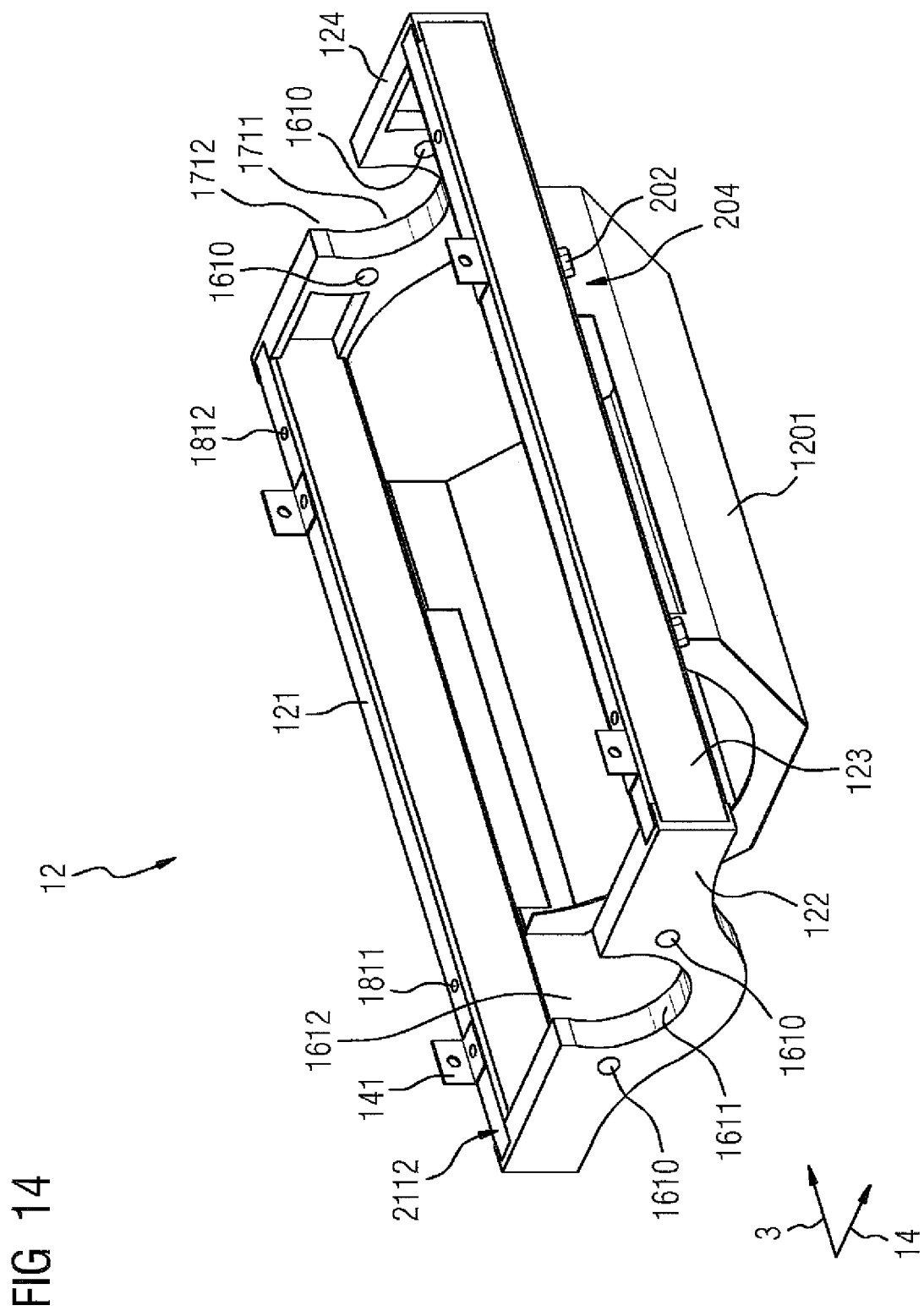
FIG. 14 shows an exemplary embodiment of a frame for an electrical machine.

FIG. 14 shows an exemplary embodiment of a frame 12 for an electrical machine. The frame 12 has the first axial frame part 123, the first radial frame part 122, the second axial frame part 121 and the second radial frame part 124, these being connected to form a frame which defines an extent of the interior chamber in the radial plane 13. (FIG. 1 also shows this with reference to the marked radial plane 13). The radial plane 13 divides a space into two parts, namely a first part of the space and a second part of the space. The first axial frame part 123, the first radial frame part 122, the second axial frame part 121 and the second radial frame part 124 form a dividing face 2112 which is offset from the radial plane in the first part of the space, wherein each frame part 121,122,123,124 has one portion of the dividing face 2112. Attached to the dividing face 2112 of the frame 12 is an angle 141 with a hole, by means of which the first device 72 of a sleeve 1311 of an electrical machine according to the invention can be detachably connected to the frame using a securing element 200. Furthermore, the first and the second axial frame parts 123,121 have holes 1811 and 1812, these being component parts of the second dividing device 18 by means of which the frame 12 can be secured to a second device 112,1123,1124 or a base 1100, 1101 as a second device. The first radial frame part 122 has a recess 1611 for a first bearing device 16 of an electrical machine according to the invention, with an opening 1612 which can surround the lateral area of the first bearing device 16 in a radial direction. Since part of the first bearing device 16 which is accommodated in the recess 1611 after installation of the bearing device 16 has a circular cross section, this part of the first bearing device 16 has a lateral area in a radial direction, one length of said lateral area corresponding to the diameter of this part of the first bearing device 16. Accordingly, the opening 1612 has a length, in the first radial direction 14, which corresponds to at least the length of the diameter of this part of the first bearing device 16. The same applies correspondingly to a recess 1711 for a second bearing device 17 of an electrical machine according to the invention, and to an opening 1712. Furthermore, a dividing device of an electrical machine according to the invention can have a third dividing device 204 comprising detachable contact points for removing an outer partial guide device 1201 from the frame 12. For this purpose, the frame 12 has the third dividing device 204 comprising detachable contact points for removing an outer partial guide device 1201 from the frame 12. For this purpose, as parts of dividing units of the third dividing device 204 comprising detachable contact points, the frame can have faces with holes on the first axial frame part 123 and on the second axial frame part 121 in the second part of the space. In the exemplary embodiment of the frame 12 according to FIG. 14, the outer partial guide device 1201 is secured to the frame 12 by means of the third dividing device 204 comprising detachable contact points on the frame. For this purpose, the third dividing device 204 has dividing units, which comprise bolts 202 and the holes on the first axial frame part 123 and the second axial frame part 121 in the second part of the space. The bolts 202 and the holes, which are threaded, provide the detachable contact points. In a further exemplary embodiment of a frame, dividing units comprising snap-fit connections are present instead of the dividing units comprising bolts and nuts. For this purpose, an outer partial guide device of the further exemplary embodiment has projections which snap into the holes. The holes can also be recesses having a rectangular shape in this case.

Figure 15:
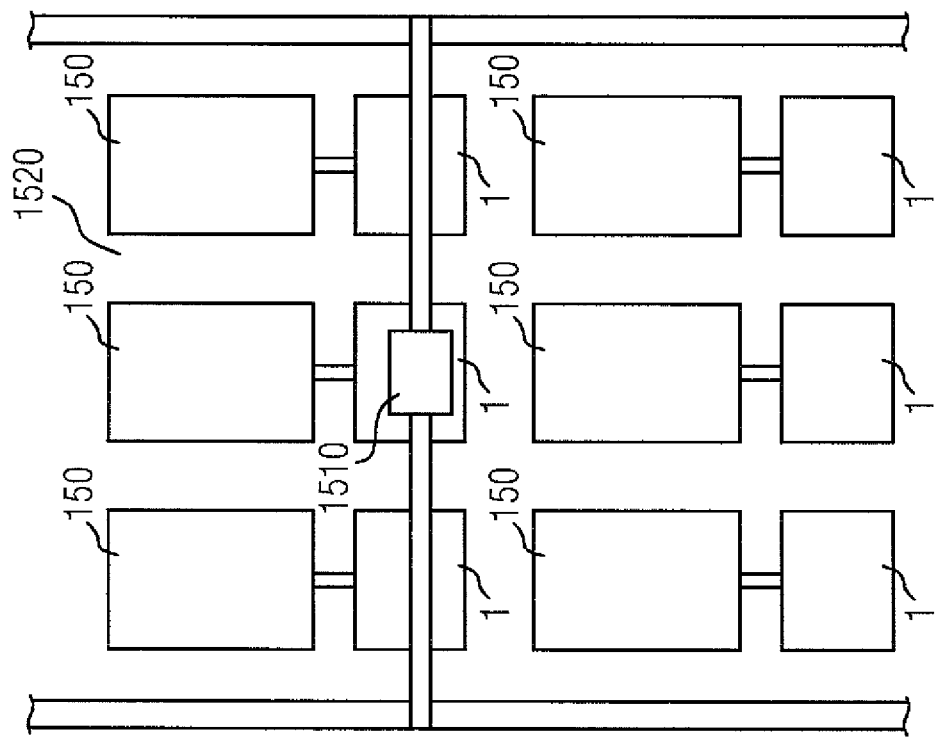
FIG. 15 shows the first exemplary embodiment of an electrical machine at an installation site.

FIG. 15 shows the first exemplary embodiment of the electrical machine 1 at an installation site 1520. The installation site 1520 is a hall in which a crane 1510 is installed, wherein said crane 1510 can move to almost any location in the hall. In order to utilize the space in the hall in an economical manner, the electrical machines 1 and the engines 150 they drive are installed close to each other. In an exemplary embodiment of a method for servicing an electrical machine according to the invention, e.g. the electrical machine 1, the first device of the sleeve of the electrical machine 1 can be removed. In order to allow access to the second part of the interior chamber of the electrical machine, the frame 12 with the stator and the rotor can be lifted from a second device of the sleeve. The crane 1510 can advantageously be used for this purpose, in order to remove the first device of the sleeve of the electrical machine 1 from the electrical machine 1, and a service can be performed in an economical and high-quality manner by virtue of the advantageous accessibility of the interior chamber of the electrical machine 1. In order to allow access to the second part of the interior chamber of the electrical machine, the crane 1510 can be used to lift the frame 12 with the stator and the rotor.

Figure 16:
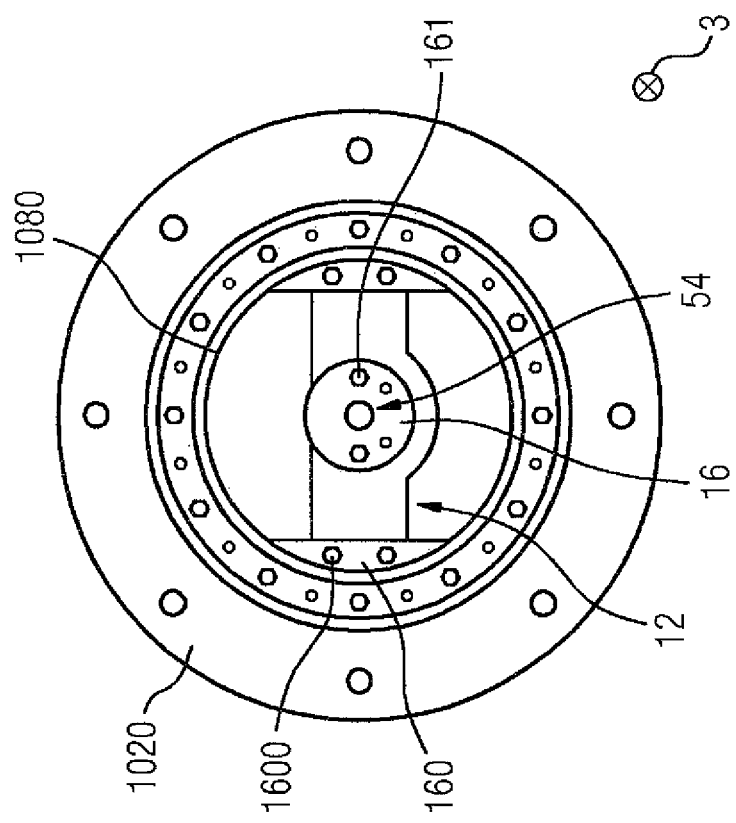
FIG. 16 shows a view, in an axial direction, of the eighth exemplary embodiment of an electrical machine.

FIG. 16 shows a view of the eighth exemplary embodiment of the electrical machine 108 in an axial direction. This was described above with reference to FIG. 10.

Figure 17:
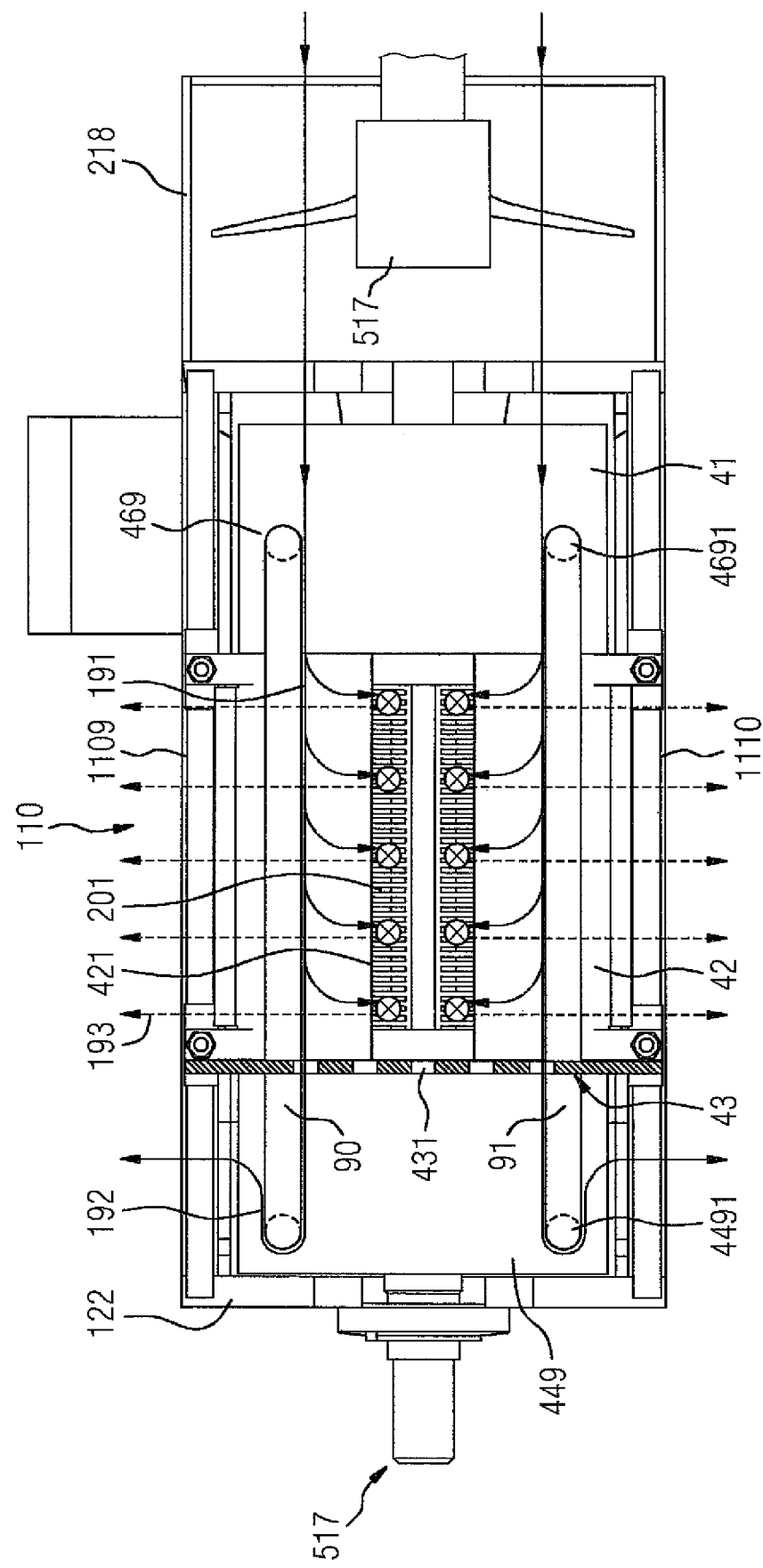
FIG. 17 shows a view of a top side of a tenth exemplary embodiment of an electrical machine, looking through a first device of a sleeve.

FIG. 17 shows a view of the top side of a tenth exemplary embodiment of an electrical machine 110, viewed through a first device of a sleeve. The tenth exemplary embodiment of the electrical machine 110 has a structure which corresponds largely to the structure of the third exemplary embodiment of the electrical machine 103 as per FIG. 4 and FIG. 5.

Instead of the heat dissipation device 51, the tenth exemplary embodiment has a separate fan 217 which is arranged in a separate fan housing 218 on that side of the electrical machine 110 having the first radial frame part. The first device of the sleeve and the second device of the sleeve are embodied exactly as per the third exemplary embodiment of the electrical machine 103. On that side of the electrical machine having the first radial frame part 124, a sleeve of the electrical machine 110 has a first axially oriented opening for cooling the electrical machine 110, said opening being connected to an axial flow space of the electrical machine 110. The first axially oriented opening can be provided in the first device 72 (see FIG. 5) in an advantageously economical and high-quality manner for an electrical machine by means of the opening 47 adjacent to the frame 12. A second axially oriented opening for cooling the electrical machine 110 is advantageously provided in the second device 1121 (see FIG. 5) of the sleeve, adjacent to the frame 12 on that side of the electrical machine 110 having the second radial frame part 124, in an advantageously economical and high-quality manner for an electrical machine. The separate fan 217 can therefore convey a gaseous coolant, e.g. air, into the electrical machine 110 in the flow direction 191 over almost the entire cross section of the electrical machine 110 in an advantageously economical manner. A rotor 517 of the electrical machine 110 can advantageously have a shaft which, on the side of the second radial frame part, does not project or only projects slightly beyond the second radial frame part and beyond the frame 12. The stator of the electrical machine 110 has the first and the second protective tube 449,469, the opening 4491 of the first protective tube 449 being connected via the overflow channel 91 to the opening 4691 of the second protective tube 469.

Figure 18:
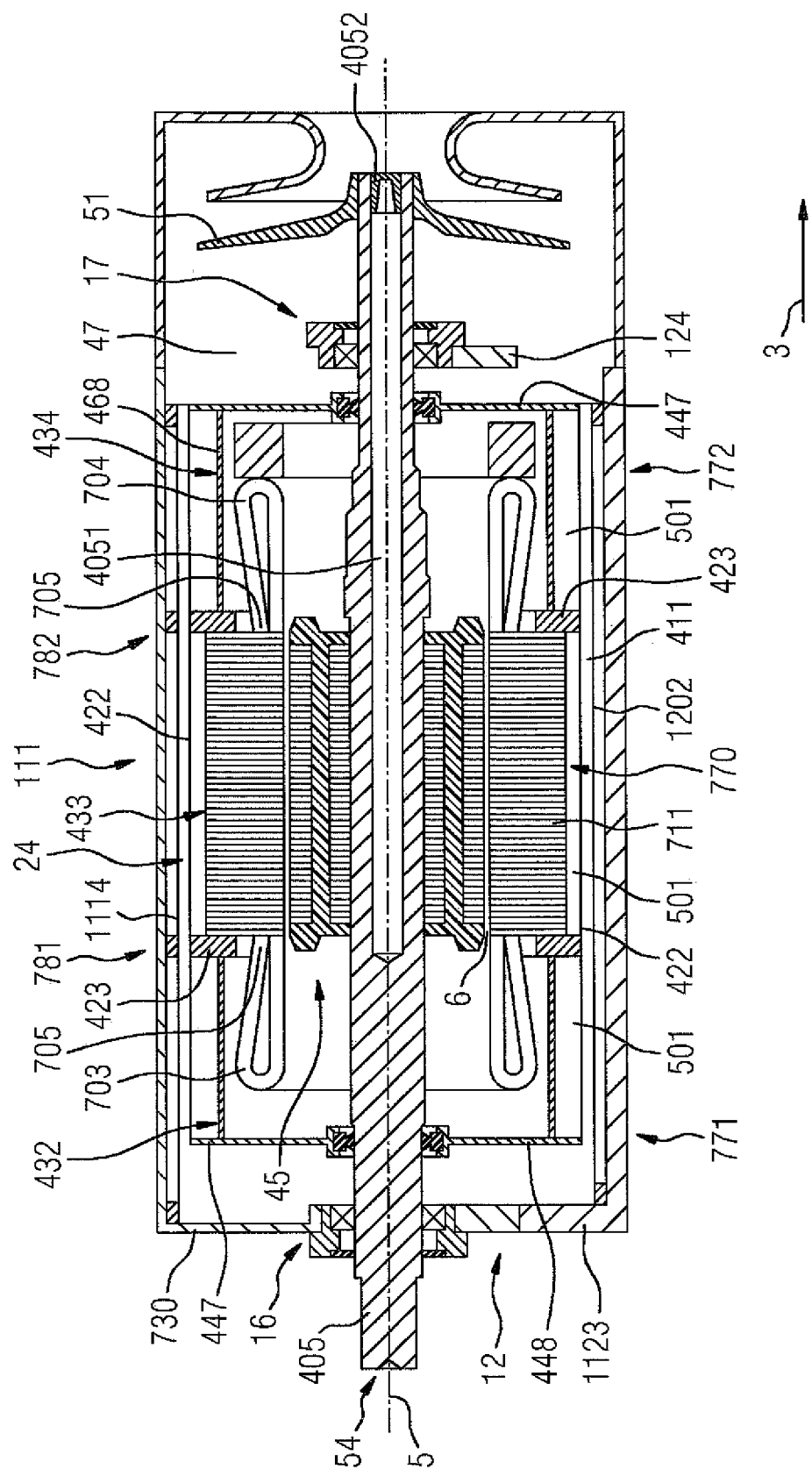
FIG. 18 shows a section through an eleventh exemplary embodiment of an electrical machine.

FIG. 18 shows a section through an eleventh exemplary embodiment of an electrical machine 111. The electrical machine 111 comprises a stator 770 having a flow arrangement 24 for cooling the electrical machine 111. The electrical machine 111 has a guide device 422 which is arranged between an axial flow space 411 and a first space 501 in an interior chamber of the electrical machine 111. The stator winding heads 703, 704 are arranged at the first axial end 781 and the second axial end 782 of the stator 770, and are an integral part of a plurality of windings which are secured to the stator 770. The windings extend in the axial direction 3 from a first axial end 771 of the winding 705 to the first axial end 781 of the stator 770, then through grooves on a surface of the stator 770, said surface facing the rotor at the air gap 6, to the second axial end 782 of the stator 770 and from there to a second axial end 772 of the winding 705. The stator winding heads 703,704 are situated between the first axial end 771 of the winding 705 and the first axial end 781 of the stator 770, and between the second axial end 782 of the stator 770 and the second axial end 772 of the winding 705. The guide device 422 extends in the axial direction 3, at least from a first axial end 771 of a winding 705 of the stator 770 to a second axial end 772 of the winding 705 of the stator 770. The guide device 422 is secured to the stator 770 of the electrical machine 111 by means of detachable connection elements at securing units 423 at the first and second axial end 781,782 of the stator 770. For this purpose, the stator 770 can have threaded holes on the securing units 423, said threaded holes allowing a detachable connection when used with bolts. The guide device 422 has a passage arrangement for the coolant in the axial direction 3 along a tangential surface 432,433,434 of the stator 770. It is then advantageously possible to achieve a more uniform temperature distribution of the coolant from the first axial end 771 of the winding 705 of the stator 770 to the second axial end 772 of the winding 705 of the stator 770, in the axial flow space 411 and in the first space 501, and to guide a colder coolant from the axial flow space 411 more uniformly along the stator 770, i.e. from the first axial end 771 of the winding 705 of the stator 770 to the second axial end 772 of the winding 705 of the stator 770, in the axial direction 3 into the first space 501 at the tangential surface 432,433,434 of the stator 770. The stator 770 of the electrical machine 111 has a first protective tube 448 and a second protective tube 468, the first protective tube 448 being secured between the first radial frame part 122 and the first axial end 781 of the stator 770, and the second protective tube 468 between the second axial end 782 of the stator 770 and the second radial frame part 124. The guide device 422 is secured to the first and second protective tube 448,468 by means of detachable connection elements at securing units 447 at the first and second axial end 781,782 of the stator 770. A view of a top side of the eleventh exemplary embodiment can be derived from FIG. 4, wherein the guide device 422 is drawn in over the first protective tube 44 and the second protective tube 46 there, and the guide device 422 over the first protective tube 44 and the second protective tube 46 has an extension of the passage arrangement 421 as far as the first and the second axial end 771,772 of the winding 705 (see FIG. 18). Flow directions of the coolant corresponding essentially to the flow directions 191,193 marked in FIG. 4 are then likewise produced in the region of the first and second protective tube 448,468 (see FIG. 18). While the baffle device 43 has openings 431 in FIG. 4, the securing units 423 at the first and second axial end 781,782 of the stator 770 of the eleventh exemplary embodiment extend slightly in a tangential direction. In the case of an electrical machine according to the invention having a first and second protective tube, it is possible in an advantageously economical manner to achieve a high-quality electrical machine according to the invention by virtue of a higher cooling capacity at the first and second protective tube. In the case of an electrical machine according to the invention without a first and second protective tube, it is possible in an advantageously economical manner to achieve a high-quality electrical machine according to the invention by virtue of a baffle device, e.g. baffle device 43 having openings 431 as per FIG. 4, since a cooling capacity which is lower at the stator winding heads than at the tangential surface of the stator between the stator winding heads can produce increased efficiency of the electrical machine according to the invention without a first and second protective tube. In a further exemplary embodiment of a series of electrical machines, based on the exemplary embodiment of the series 1200 of electrical machines, the third exemplary embodiment of the electrical machine 103 as per FIG. 4 and FIG. 5 can advantageously be replaced by an electrical machine as per FIG. 4 and FIG. 5 without a first and second protective tube 44, 46, and the further exemplary embodiment of a series of electrical machines can advantageously be supplemented by the eleventh exemplary embodiment of the electrical machine 111. The electrical machine 111 as per FIG. 18 has a sleeve comprising a first device 730 and the second device 1123. An outer guide device 1114 is secured to the first device 730, and extends from a first axial end of the first device 730 in an axial direction to a second axial end of the device 730. The outer guide device 1114 extends at least from the first axial end 771 of the winding 5 to the second axial end 772 of the winding 5. This allows a coolant flow to be guided in an advantageously economical manner and the interior chamber to be made advantageously accessible outside of the radial plane 13 and outside of the parallel planes 131 by means of the dividing device, since removal of the first device 730 of the sleeve from the frame 12 automatically includes removal of the outer guide device 1114. For the purpose of removing an outer partial guide device 1202, the outer partial guide device 1202 is secured to the frame 12 at the third dividing device 204 by means of detachable contact points. The outer partial guide device 1202 extends from the first radial frame part 122 in an axial direction 3 to the second radial frame part 124. The outer partial guide device 1202 extends at least from the first axial end 771 of the winding 5 to the second axial end 772 of the winding 5. The outer partial guide device 1202 in an electrical machine according to the invention can therefore advantageously be designed, for the purpose of guiding a coolant flow in the interior chamber, in a shape which is advantageous for a specific electrical machine according to the invention and/or for a specific installation site.

Although the invention is described in detail with reference to the preferred exemplary embodiments, it is not limited to the examples disclosed herein. Other variations may be derived therefrom by a person skilled in the art, without thereby departing from the scope of the invention.

What is claimed is:

1. An electrical machine, comprising:
a frame including a first axial frame part, a first radial frame part, a second axial frame part and a second radial frame part connected together to form said frame, wherein the first axial frame part is directly connected to the first radial frame part and the second radial frame part, and the second axial frame part is directly connected to the first radial frame part and the second radial frame part;
a rotor mounted for rotation about a rotational axis which extends in an axial direction; and
a stator configured to extend along the rotational axis from a first axial end to a second axial end of the stator, said stator interacting with the rotor across an air gap during operation of the electrical machine; said stator including a fastening device configured to secure the stator to the frame and including four fastening units each having an adjustment device for adjusting the air gap by changing a position of the stator relative to the frame, said fastening device including a stiffening element extending in the axial direction for stiffening the stator, said stiffening element including the fastening units of the fastening device and provided for guiding a coolant out of the stator in a radial direction perpendicular to the axial direction,
wherein said frame defines in a radial plane an extent of an interior chamber for accommodating the stator and the rotor, with the radial plane being defined by the axial direction and a first radial direction which is perpendicular to the axial direction, and further comprising
a sleeve including a first device that at least partly surrounds the interior chamber;
a dividing device provided on the frame and configured to render the interior chamber accessible outside of the radial plane and outside of parallel planes, with the parallel planes intersecting the frame in parallel relation to the radial plane;
a first bearing device provided on the frame to mount the rotor at a first axial end for rotation about the rotational axis; and
a second bearing device provided on the frame to mount the rotor at a second axial end for rotation about the rotational axis,
wherein two of the four fastening units are located on a side of the electrical machine having the first axial frame part and another two of the four fastening units are located on a side of the electrical machine having the second axial frame part.

2. The electrical machine of claim 1, wherein the stiffening element extends within a lateral area of the stator as viewed in the axial direction.

3. The electrical machine of claim 1, wherein the dividing device includes a first dividing device between the first device of the sleeve and the frame, said first dividing device comprising detachable contact points for removing the first device of the sleeve from the frame.

4. The electrical machine of claim 1, wherein the first device of the sleeve surrounds the interior chamber at least from the first axial end of the stator to the second axial end of the stator.

5. The electrical machine of claim 1, further comprising a securing device configured to secure the frame to a flange for operation of the electrical machine, with the rotational axis extending in a vertical direction.

6. The electrical machine of claim 1, wherein the first device surrounds the interior chamber on a first side of the frame at least from the first radial frame part to the second radial frame part.

7. The electrical machine of claim 1, wherein the dividing device includes a second dividing device having detachable contact points for lifting the frame from a second device.

8. The electrical machine of claim 7, wherein the second device is a base located at an installation site of the electrical machine.

9. The electrical machine of claim 7, wherein the second device is a component of the sleeve.

10. The electrical machine of claim 7, wherein the second device includes concrete.

11. The electrical machine of claim 1, wherein the dividing device includes a third dividing device having detachable contact points for removing an outer partial guide device from the frame.

12. The electrical machine of claim 1, further comprising a terminal box secured to the frame and configured for laying a lead from the stator via the frame to the terminal box.

13. The electrical machine of claim 1, wherein the first bearing device is configured for removal from the first radial frame part in a second radial direction in perpendicular relation to the radial plane, said second bearing device being configured for removal from the second radial frame part in the second radial direction.

14. The electrical machine of claim 1, further comprising an outer guide device secured to the first device.

15. The electrical machine of claim 1, wherein the stator includes a flow arrangement configured to cool the electrical machine, said dividing device being configured to render the flow arrangement accessible outside of the radial plane and outside of the parallel planes.

16. The electrical machine of claim 15, wherein the flow arrangement has recesses defined by linear extensions which extend in a plane perpendicular to the axial direction.

17. The electrical machine of claim 1, wherein the sleeve has on a side of the electrical machine having the first axial frame part a first opening for cooling the electrical machine, said first opening connected to a first space which adjoins a tangential surface of the stator.

18. The electrical machine of claim 17, wherein the sleeve has on said side a second opening for cooling the electrical machine, with the first axial frame part being situated between the first opening and the second opening.

19. The electrical machine of claim 1, wherein the sleeve has on a side of the electrical machine having the second radial frame part a first axially oriented opening for cooling the electrical machine, said first axially oriented opening being connected to an axial flow space.

20. The electrical machine of claim 17, wherein the sleeve has on a side of the electrical machine having the second radial frame part a first axially oriented opening for cooling the electrical machine, said first axially oriented opening being connected to an axial flow space, and further comprising a guide device arranged between the axial flow space and the first space in the interior chamber.

21. The electrical machine of claim 1, further comprising a baffle device arranged in the interior chamber at the first axial end of the stator.

22. The electrical machine of claim 21, wherein the stator has a winding, a guide device extending in the axial direction at least from a first axial end of the winding to a second axial end of the winding.

23. The electrical machine of claim 1, wherein the stator includes a first protective tube and a second protective tube, said first protective tube being secured between the first radial frame part and the first axial end of the stator, and the second protective tube being secured between the second axial end of the stator and the second radial frame part.

24. The electrical machine of claim 23, wherein the first protective tube has an opening which is connected via an overflow channel to an opening of the second protective tube.

25. The electrical machine of claim 1, further comprising a heat dissipation device situated within the frame at the first or second axial end of the rotor in the axial direction, said rotor having a shaft for rotatably mounting the rotor in the first and second bearing devices, said shaft having a hole in the axial direction for transporting waste heat of the electrical machine to the heat dissipation device.

26. The electrical machine of claim 1, further comprising a heat dissipation device situated outside the frame in the axial direction, said rotor having a shaft for rotatably mounting the rotor in the first and second bearing devices, said shaft having a hole in the axial direction for transporting waste heat of the electrical machine to the heat dissipation device.

27. A method for servicing an electrical machine, comprising:
   providing a frame to define in a radial plane an interior chamber for accommodating a stator and a rotor of the electrical machine, said frame including a first axial frame part, a first radial frame part, a second axial frame part and a second radial frame part connected together to form said frame, wherein the first axial frame part is directly connected to the first radial frame part and the second radial frame part, and the second axial frame part is directly connected to the first radial frame part and the second radial frame part; and
   accessing the interior chamber outside of the radial plane and outside of parallel planes via a dividing device,
   wherein said rotor is mounted for rotation about a rotational axis which extends in an axial direction,
   wherein said stator is configured to extend along the rotational axis from a first axial end to a second axial end of the stator, said stator interacting with the rotor across an air gap during operation of the electrical machine; said stator including a fastening device configured to secure the stator to the frame including four fastening units each having an adjustment device for adjusting the air gap by changing a position of the stator relative to the frame, said fastening device including a stiffening element extending in the axial direction for stiffening the stator, said stiffening element including the fastening units of the fastening device and provided for guiding a coolant out of the stator in a radial direction perpendicular to the axial direction,
   wherein said radial plane is defined by the axial direction and a first radial direction which is perpendicular to the axial direction,
   wherein two of the four fastening units are located on a side of the electrical machine having the first axial frame part and another two of the four fastening units are located on a side of the electrical machine having the second axial frame part.

28. A method for producing an electrical machine, comprising:
   assembling a frame from a first axial frame part, a first radial frame part, a second axial frame part and a second radial frame part to define in a radial plane an interior chamber, said first axial frame part directly connected to the first radial frame part and the second radial frame part, and said second axial frame part directly connected to the first radial frame part and the second radial frame part;
   placing a stator and a rotor in the interior chamber; and
   rendering the interior chamber outside of the radial plane and outside of parallel planes accessible via a dividing device,
   wherein said rotor is mounted for rotation about a rotational axis which extends in an axial direction,
   wherein said stator is configured to extend along the rotational axis from a first axial end to a second axial end of the stator, said stator interacting with the rotor across an air gap during operation of the electrical machine; said stator including a fastening device configured to secure the stator to the frame and including four fastening units each having an adjustment device for adjusting the air gap by changing a position of the stator relative to the frame, said fastening device including a stiffening element extending in the axial direction for stiffening the stator, said stiffening element including the fastening units of the fastening device and provided for guiding a coolant out of the stator in a radial direction perpendicular to the axial direction,
   wherein said radial plane is defined by the axial direction and a first radial direction which is perpendicular to the axial direction,
   wherein two of the four fastening units are located on a side of the electrical machine having the first axial frame part and another two of the four fastening units are located on a side of the electrical machine having the second axial frame part.

* * * * *